(12) United States Patent
Getchell

(10) Patent No.: US 10,689,050 B2
(45) Date of Patent: Jun. 23, 2020

(54) REAR MOUNTED BICYCLE RACK SYSTEM

(71) Applicant: Shawn Getchell, Mastic Beach, NY (US)

(72) Inventor: Shawn Getchell, Mastic Beach, NY (US)

( * ) Notice: Subject to any disclaimer, the term of this patent is extended or adjusted under 35 U.S.C. 154(b) by 239 days.

(21) Appl. No.: 15/602,805

(22) Filed: May 23, 2017

(65) Prior Publication Data

US 2018/0339740 A1  Nov. 29, 2018

(51) Int. Cl.
*B62J 1/00* (2006.01)
*B62J 1/28* (2006.01)
*B62J 1/16* (2006.01)
*B62J 7/04* (2006.01)
*B62J 9/20* (2020.01)
*B62J 1/14* (2006.01)

(52) U.S. Cl.
CPC . *B62J 1/28* (2013.01); *B62J 1/16* (2013.01); *B62J 7/04* (2013.01); *B62J 1/14* (2013.01); *B62J 9/20* (2020.02)

(58) Field of Classification Search
CPC .................. B62J 1/28; B62J 1/14; B62J 9/001
USPC ........................................... 224/419; 280/202
See application file for complete search history.

(56) References Cited

U.S. PATENT DOCUMENTS

| 1,030,844 A | * | 6/1912 | Howell | B62J 1/14 280/202 |
| 2,320,444 A | * | 6/1943 | Martin | F01B 17/00 137/471 |
| 3,786,972 A | * | 1/1974 | Alley | B62J 9/00 224/153 |
| 3,802,598 A | * | 4/1974 | Burger | B62J 1/14 280/202 |
| 3,873,127 A | * | 3/1975 | McNichol, Jr. | B62J 1/00 280/202 |
| 3,903,944 A | * | 9/1975 | Montgomery | A45C 3/00 224/417 |
| 4,053,091 A | * | 10/1977 | Martelet | B62J 1/16 224/415 |

(Continued)

FOREIGN PATENT DOCUMENTS

| DE | 10104958 A1 | 8/2002 |
| DE | 202010003533 | 7/2010 |

(Continued)

OTHER PUBLICATIONS

International Search Report dated Jun. 8, 2018, that issued in the corresponding PCT/US18/24522.

*Primary Examiner* — Nathan J Newhouse
*Assistant Examiner* — Lester L Vanterpool
(74) *Attorney, Agent, or Firm* — Cowan, Liebowitz & Latman, P.C.; Mark Montague; Brian S. Matross

(57) ABSTRACT

A bicycle rack system comprises a main frame configured to be mounted over a rear wheel of a bicycle. The main frame comprises a top platform for accommodating one or more first auxiliary devices, the top platform having a first platform section and a second platform section, at least one of the first and second platform sections configured to accommodate the first auxiliary device, and a lower deck for accommodating one or more second auxiliary devices, the lower deck having a first deck section and a second deck section, at least one of the first and second deck sections configured to accommodate the second auxiliary device.

19 Claims, 41 Drawing Sheets

(56) References Cited

U.S. PATENT DOCUMENTS

| | | | |
|---|---|---|---|
| 4,141,587 A | 2/1979 | Holcomb | |
| 4,258,870 A | 3/1981 | Edelson | |
| 4,364,497 A | 12/1982 | Zimmerli | |
| 4,367,829 A * | 1/1983 | Kusz | B62J 7/04 224/415 |
| 4,442,960 A * | 4/1984 | Vetter | B62J 9/00 190/108 |
| 4,487,344 A * | 12/1984 | Blackburn | B62J 9/00 224/424 |
| 4,562,944 A * | 1/1986 | Jackson | B62J 9/00 224/417 |
| 4,592,592 A * | 6/1986 | Peek | B62J 1/16 297/243 |
| 4,928,863 A * | 5/1990 | Morgan | B62J 7/04 224/422 |
| 4,964,551 A * | 10/1990 | O'Donovan | B62J 1/16 224/415 |
| 5,244,132 A * | 9/1993 | Christen | B62J 9/00 206/287.1 |
| 5,285,935 A * | 2/1994 | Hsueh | B62J 1/16 224/413 |
| 5,299,818 A * | 4/1994 | Newbold | B62J 1/16 224/415 |
| 5,350,093 A | 9/1994 | Sheely | |
| 5,423,462 A * | 6/1995 | Dickhaus | B62J 1/16 224/415 |
| 5,542,587 A * | 8/1996 | Broz | B62J 1/16 2/421 |
| 5,622,374 A * | 4/1997 | Rudeen | B62J 1/16 224/415 |
| 5,667,118 A * | 9/1997 | Faasse | B62J 7/02 224/419 |
| 5,810,230 A * | 9/1998 | Nutto | B62J 9/00 224/417 |
| 5,884,920 A | 3/1999 | Seto | |
| 6,547,113 B1 * | 4/2003 | Hancock | B62J 9/003 224/408 |
| 6,843,396 B2 * | 1/2005 | Champagne | B62J 7/04 224/422 |
| 7,331,629 B2 | 2/2008 | Knaven | |
| 8,251,388 B2 * | 8/2012 | Sauceda | B62J 1/16 224/415 |
| 8,453,895 B2 * | 6/2013 | Vitanza | B62J 7/04 224/454 |
| 8,640,935 B2 * | 2/2014 | Hagedoorn | B62J 1/16 224/415 |
| 8,857,686 B1 * | 10/2014 | Vitanza | B62J 7/04 224/422 |
| D723,980 S * | 3/2015 | Simons | D12/114 |
| 9,499,229 B2 * | 11/2016 | Richelle | B62J 1/16 |
| 2010/0013187 A1 * | 1/2010 | Oxley | B62J 1/16 280/402 |

FOREIGN PATENT DOCUMENTS

| | | |
|---|---|---|
| EP | 0404270 A1 | 12/1990 |
| WO | 1997/038891 A1 | 10/1997 |

\* cited by examiner

REAR MOUNTED BICYCLE RACK SYSTEM

FIELD OF INVENTION

The present invention relates to bicycle racks and more particularly to rear-mounted bicycle racks for carrying one or more passengers and/or cargo.

BACKGROUND

Bicycles have long been considered as one of the most convenient means of transportation for transporting riders and other articles from one place to another. Bicycle riding has also long been regarded as a popular recreational activity and exercise. Typically, bicycles are used for enjoying local activities, such as, going to a store for shopping, commuting to work, going out to a beach or mall with family and friends, going for a recreational ride at a park, and etc.

Often, bicycle riders are carrying articles or cargoes which are normally hand-carried items. These articles or cargoes interfere with the ability of the rider to safely maneuver and control the bicycle. In order to prevent the danger of an accident or the inconvenience of riding bicycles with such items, many devices have been introduced that can be attached to the bicycle for securely holding items such as grocery bags, books, or any other hand-carried items. These devices typically mount over the rear wheel of the bicycle or to the bicycle seat. For example, U.S. Pat. Nos. 4,258,870, 4,364,497, 4,928,863, 5,350,093, 6,843,396, 8,453,895 and 8,857,686 disclose such devices.

Moreover, many adult riders may wish to ride their bicycles with their loved one, child, pet, friend, etc. To this end, many passenger seat devices have been introduced, which are also usually mounted over the rear wheel for accommodating a toddler, child or small adult as a passenger. These passenger seat devices allow a bicycle rider to conveniently maneuver the bicycle and also safely carry a passenger while riding. For example, U.S. Pat. Nos. 4,141,587, 4,964,551, 5,884,920, 7,331,629, 8,251,388 and 9,499,229 teach such devices.

Unfortunately, mounting a device for holding cargoes or mounting passenger seat device to a bicycle often demands considerable amount of time and effort. More importantly, for most bicycles, one auxiliary device that is mounted must be removed from the bicycle before mounting another auxiliary device. Still further, because such auxiliary devices are often purchased from different manufacturers, different tools may be required for assembly. Other times, compatibility and interchangeability of the cargo holding device and the passenger seat device on a single bicycle may also generate problems in quickly mounting and removing these auxiliary devices.

SUMMARY OF THE INVENTION

It is an objective of the present invention to provide a rear-mounted bicycle rack system that includes a main frame which attaches over a rear wheel of a bicycle and allows for interchangeably mounting various auxiliary devices. It is a further objective of the present invention to provide a rear-mounted bicycle rack system that can interchangeably accommodate a large cargo deck, a small cargo deck, one or more passenger seats, or a small cargo deck with one passenger seat.

These objectives and advantages are obtained by a bicycle rack system comprising a main frame configured to be mounted over a rear wheel of a bicycle. The main frame comprises a top platform for accommodating one or more first auxiliary devices, the top platform having a first platform section and a second platform section, at least one of the first and second platform sections configured to accommodate the first auxiliary device and a lower deck for accommodating one or more second auxiliary devices, the lower deck having a first deck section and a second deck section, at least one of the first and second deck sections configured to accommodate the second auxiliary device.

Other objectives, features and advantages of the present invention will become apparent from the following detailed description and the accompanying drawings.

DETAILED DESCRIPTION

Figure 1:
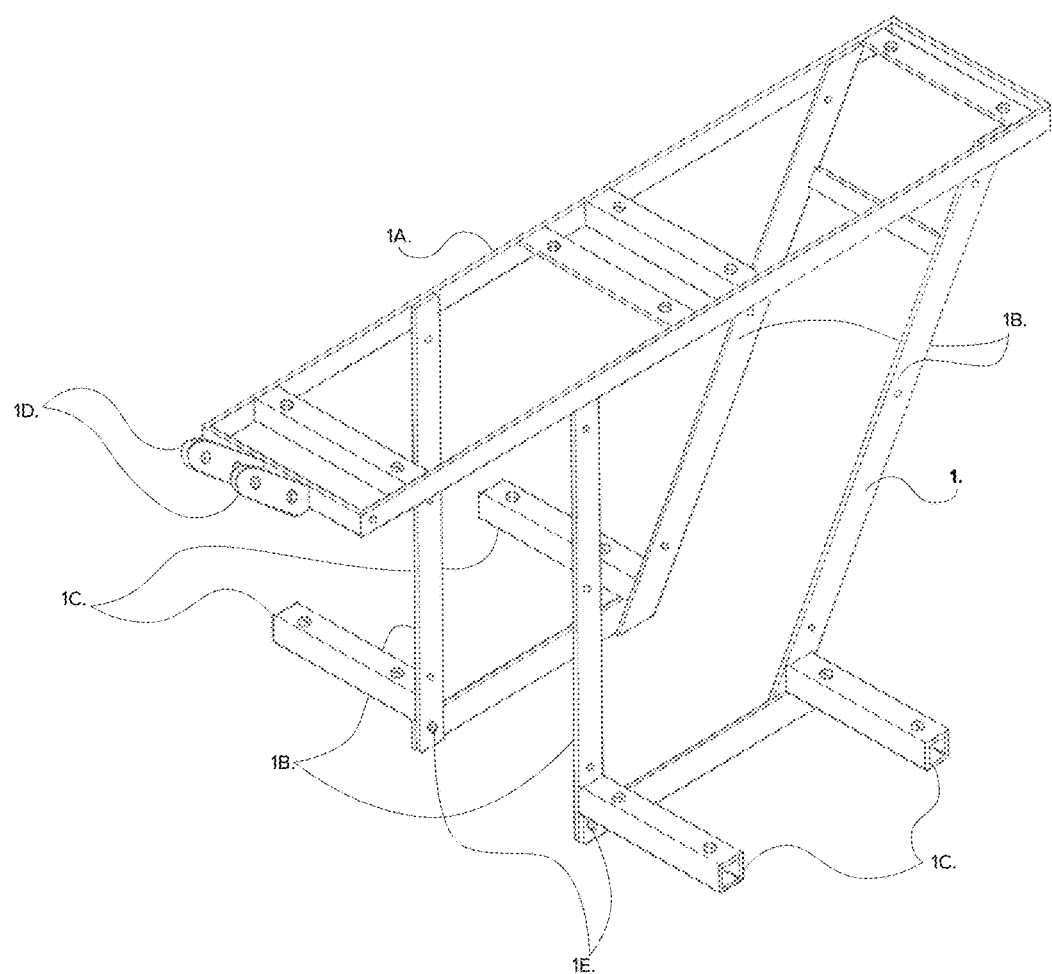
FIG. 1 shows a schematic illustration of a main frame of a rear mounted bicycle rack system in accordance with an embodiment of the present invention.

To facilitate an understanding of the principles and features of the various embodiments of the disclosure, reference is made to the accompanying drawings, which form a part hereof. It will be appreciated that for simplicity and clarity of illustration, where appropriate, reference numerals have been repeated among the different figures to indicate corresponding or analogous elements, unless context dictates otherwise.

This description may use the phrases "in an embodiment," "in embodiments," "in some embodiments," or "in an alternative embodiment," which may each refer to one or more of the same or different embodiments in accordance with the present disclosure. It is to be understood that the disclosed embodiments are merely exemplary of the invention that may be embodied in various and alternative forms.

In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described.

The present invention, in accordance with various embodiments and variations as described below, provides a bicycle rack system that can easily be mounted over a rear wheel of a bicycle of any size. A main frame of the rack system is designed to accommodate various auxiliary devices (e.g., a passenger seat or a saddle bag) at once. Processes for installation and uninstallation of any of these auxiliary devices are made extremely simple in order to drastically reduce the amount of time and effort needed. Furthermore, in accordance with the present invention, the bicycle rack system advantageously provides alternative means for carrying two passengers on the rear of a bicycle, one passenger and a cargo, or simply a large cargo, in a remarkably secure manner.

Referring now to the drawings, various embodiments for a bicycle rack system installed over a rear wheel of a bicycle is shown generally in FIGS. 1, 4-5, 7, 9, 11, 13, 15-16, 18, 21-35, 37 and 39-41. In each embodiment, the bicycle rack system comprises a main frame that is mounted over the rear wheel.

FIG. 1 shows a schematic illustration of an exemplary main frame 1 in accordance with an embodiment of the present invention. The main frame 1 is comprised of a top platform 1A, vertical support bars 1B, foot support bars 1C, tongues 1D and axle-bracket holes 1E. As shown in FIG. 1, the top platform 1A is divided into a first section (toward a front end) and a second section (toward a rear end). As will be illustrated and discussed later in more detail, the top platform 1A of the main frame 1 can accommodate one or more auxiliary mounting devices (e.g., a passenger seat, cargo board, saddle bag, etc.), one in the first section and another in the second section. Also shown in FIG. 1 are the foot support bars 1C provided on respective sides of the main frame 1. As will be illustrated and discussed later in more detail, the respective foot support bars 1C can each accommodate a foot deck. Also shown in FIG. 1 are the tongues 1D at the front end of the top platform 1A. As will be illustrated and discussed later in more detail, the tongues engage with a seat post bracket and secure the main frame 1 to a seat post of a bicycle. Finally, shown in FIG. 1 are the axle-bracket holes 1E provided at or near the bottom of the vertical support bars 1B and preferably even below the foot support bars 1C. As will be illustrated and discussed later in more detail, the axle-bracket holes 1E align with a hub on a rear wheel of a bicycle and secure the main frame 1 to the rear wheel of the bicycle.

The exemplary main frame 1 and the components of the main frame 1 as shown in FIG. 1 are not intended to be limiting the scope of the invention in any way. The structure of the main frame, such as the size of the main frame itself or the relative length, width or thickness, and number of the components of the main frame may vary in order to accommodate for different sizes of rear wheels of various bicycle designs, and/or to provide additional stability, control or balance based on weight of other parts of the bicycle and/or of one or more passengers. The main frame, as well as its components, may be made of any suitable metals (e.g., steel, aluminum, etc.), carbon fiber, or hardwood, but are not limited to such materials. In alternative embodiments, a main frame may employ fewer or more components without departing from the scope of the present invention.

Figure 2:
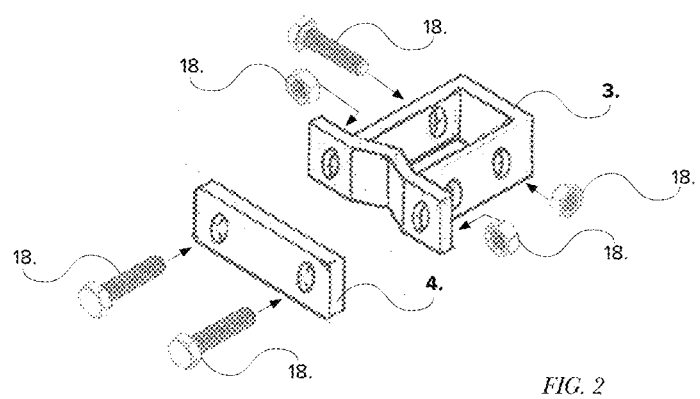
FIG. 2 shows a schematic illustration of a seat post bracket for attaching the main frame to a seat post of a bicycle.

FIG. 2 shows a schematic illustration of a seat post bracket in accordance with an embodiment of the present invention. The seat post bracket is comprised of a back portion 3 and a front portion 4. The back portion 3 of the seat post bracket comprises a series of holes and at least one or more of these holes align with a corresponding set of holes in the tongues 1D of the main frame 1. Once the holes are aligned, the back portion 3 of the seat post bracket engages with the tongues 1D of the main frame 1 via a series of connectors 18 that protrude through the holes. The connectors 18 as shown in FIG. 2 are a set of nuts and bolts but the invention is not limited to such devices, and other similar engagement devices or tools may be used to secure the seat post bracket to the main frame 1.

Figure 40:
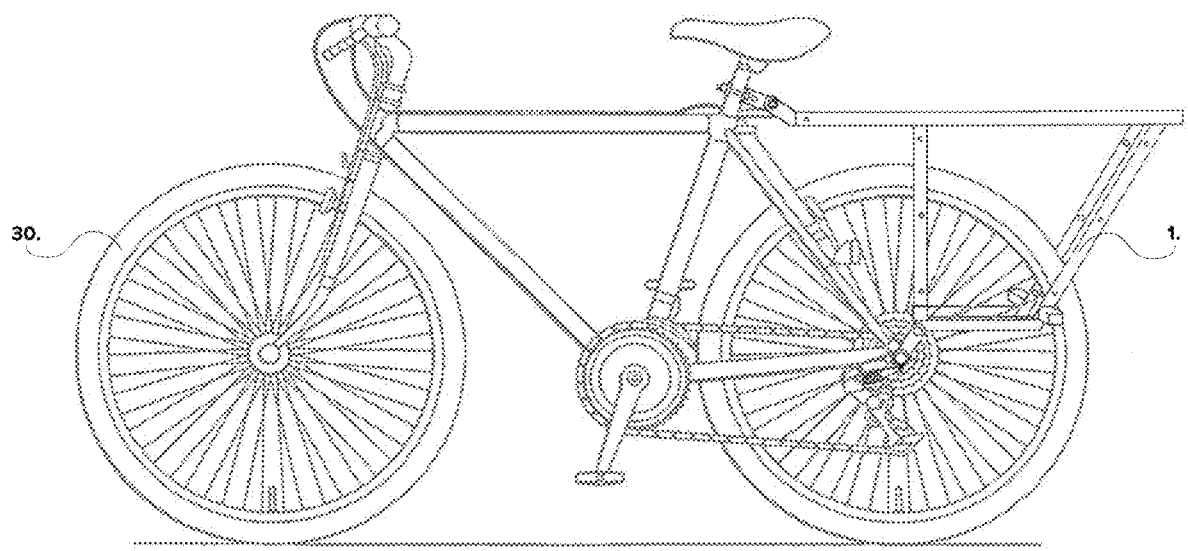
FIG. 40 shows an exemplary bicycle having the main frame attached over the rear wheel of the bicycle.
Figure 41:
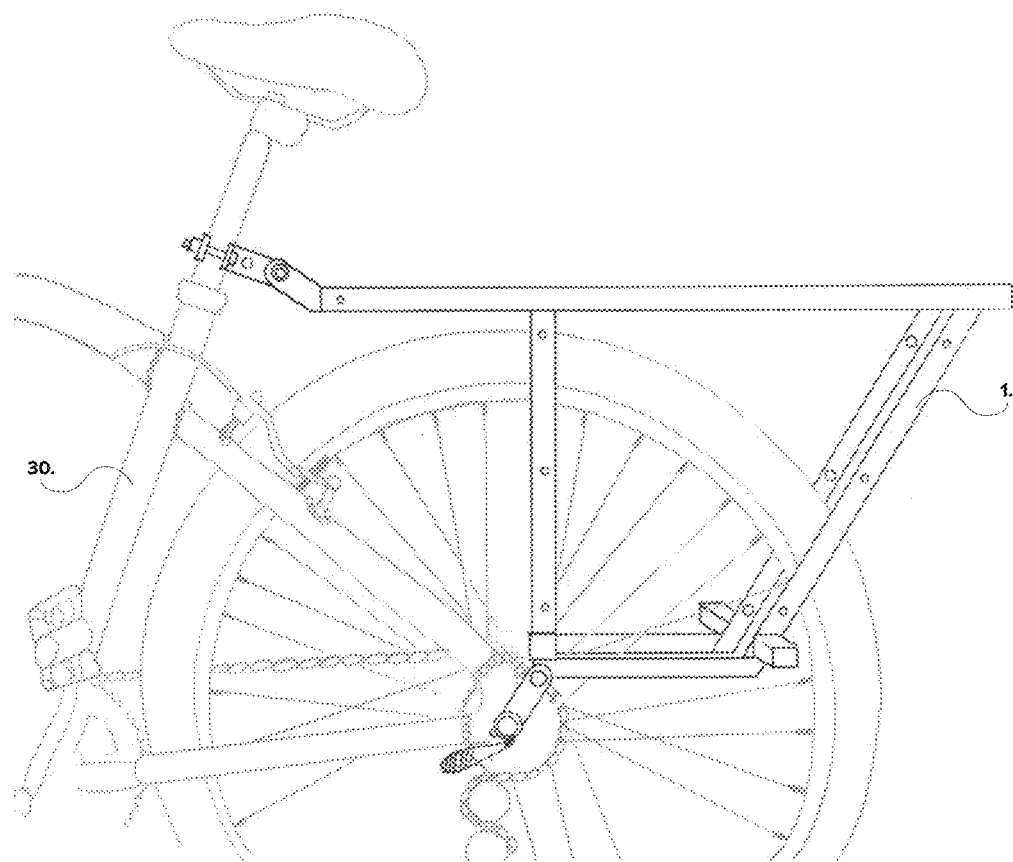
FIG. 41 is a close up view showing the connection of the main frame to the seat post and the rear wheel axle.

The front portion 4 of the seat post bracket is a separate piece that is used to secure the seat post bracket to a seat post of a bicycle (see FIGS. 40-41). The front portion 4 of the seat post bracket also includes a set of holes (e.g., one at each end) and these holes also align with a set of corresponding holes in the back portion 3 of the seat post bracket. The front portion 4, together with the back portion 3, engulfs a seat post of a bicycle (see FIGS. 40-41) and is tightened via a set of connectors 18 which protrude through the aligned holes.

Figure 3A:
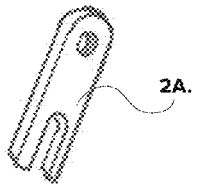
FIG. 3A shows a schematic illustration of a single-end axle bracket for attaching the main frame to a rear wheel of a bicycle.
Figure 3B:
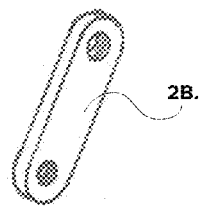
FIG. 3B shows a schematic illustration of a double-end axle bracket for attaching the main frame to a rear wheel axle of a bicycle.
Figure 4:
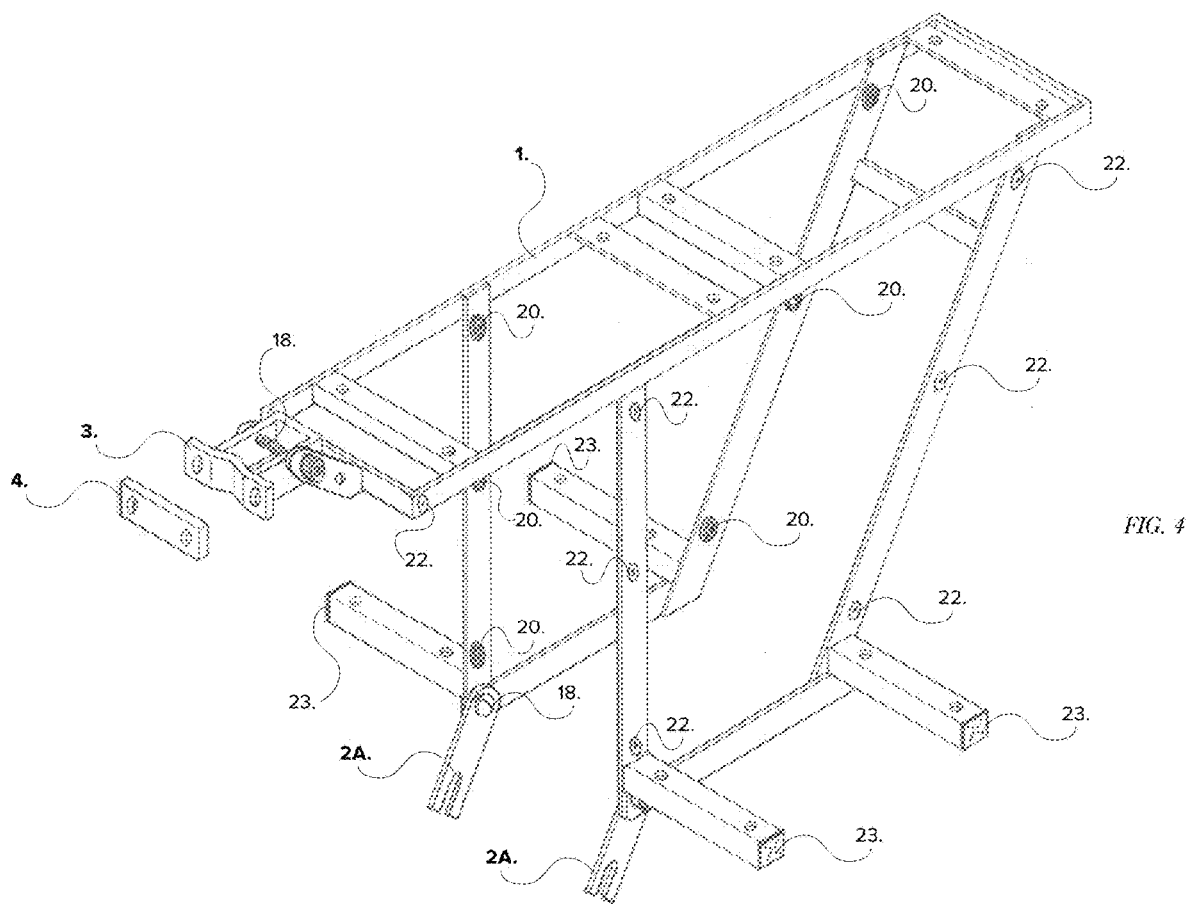
FIG. 4 shows a schematic illustration of the main frame together with the seat post bracket and a single-end axle bracket.
Figure 5:
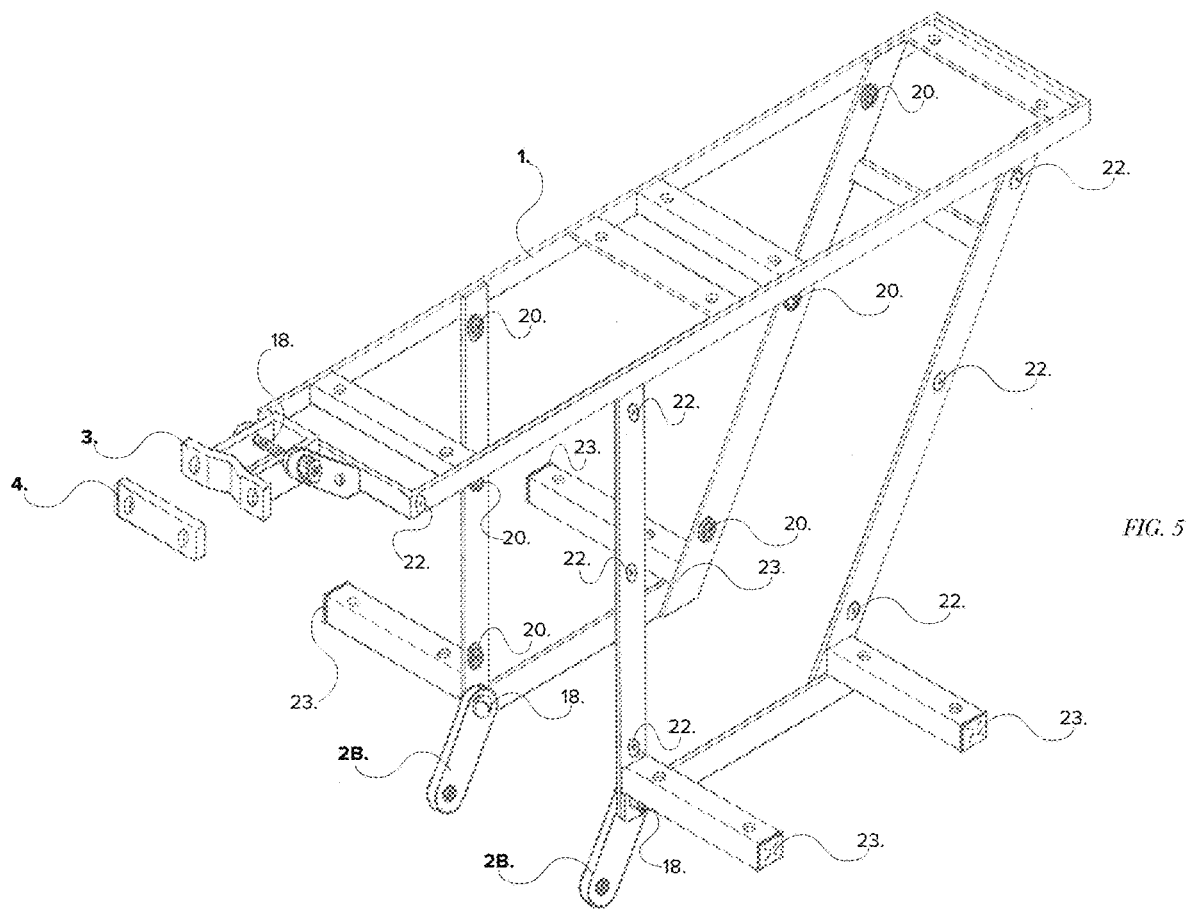
FIG. 5 shows a schematic illustration of the main frame together with the seat post bracket and a double-end axle bracket.

FIG. 3A shows a schematic illustration of a single-end axle bracket 2A and FIG. 3B shows schematic illustration of a double-end axle bracket 2B. The single-end axle brackets 2A have a hole at one end and an open end at an opposing end. The holes align with the axle-bracket holes 1E of the main frame 1 and the connectors 18 are used to lock the axle brackets to the main frame 1. The open ends of the single-end axle brackets then engage with a hub on a rear wheel of a bicycle (not shown). The connectors 18 may also be used to secure the axle brackets 2A and the main frame 1 to the hub. Unlike the single-end axle brackets 2A, the double-end axle brackets 2B have holes at both ends but engage with the hub in a similar manner. FIGS. 4 and 5 respectively shows an embodiment in which the main frame 1 has assembled thereto, the seat post bracket and the single-end axle brackets 2A and an embodiment in which the main frame 1 has assembled thereto, the seat post bracket and the double-end axle brackets 2B.

Figure 6:
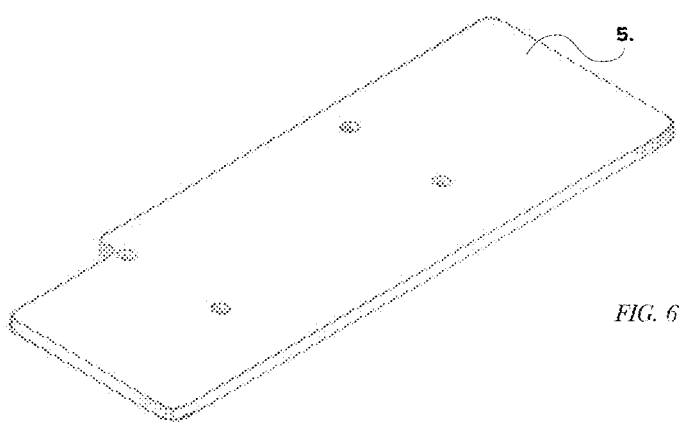
FIG. 6 shows a schematic illustration of a foot deck.
Figure 7:
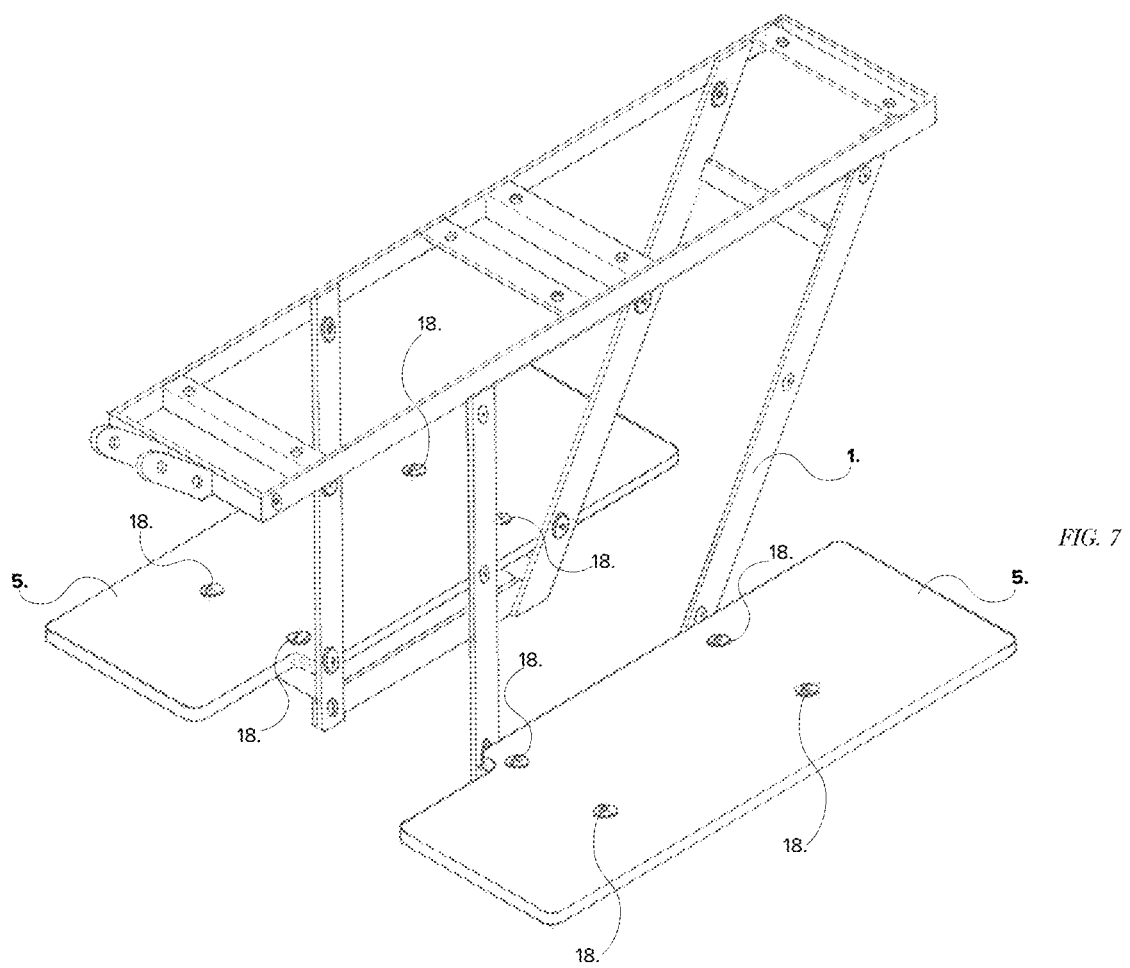
FIG. 7 shows a schematic illustration of the main frame together with the foot decks.

FIG. 6 shows a schematic illustration of a foot deck 5 in accordance with an embodiment of the present invention. The foot deck 5 comprises thereon a set of holes, one or more of which may be aligned with a set of corresponding holes on the foot support bars 1C of the main frame 1. The foot deck 5 is secured on the foot support bars 1C via the connectors 18. In a preferred embodiment, the size of the foot deck is long enough to accommodate two foot guards (to be discussed later with respect to FIGS. 19 and 20). In alternative embodiments, the foot deck may only extend for the length of the foot support bars 1C. FIG. 7 shows a schematic illustration of the main frame 1 having assembled thereon a pair of foot decks 5 via the connectors 18.

Figure 8:
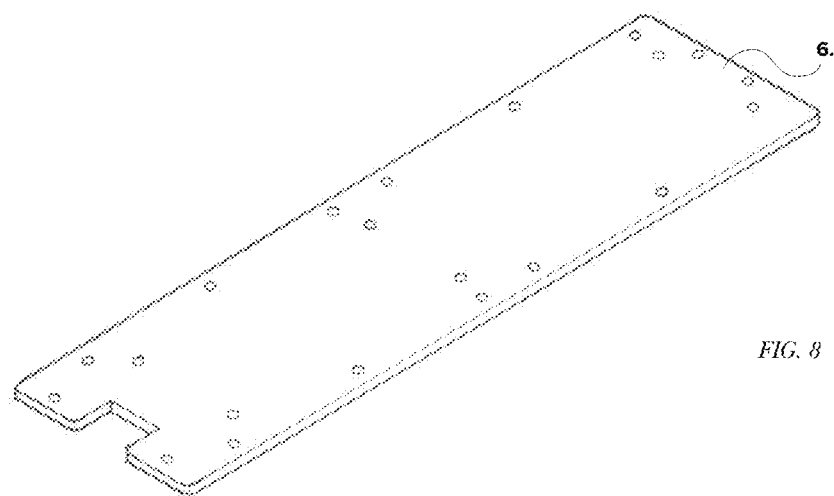
FIG. 8 shows a schematic illustration of a large cargo deck.
Figure 9:
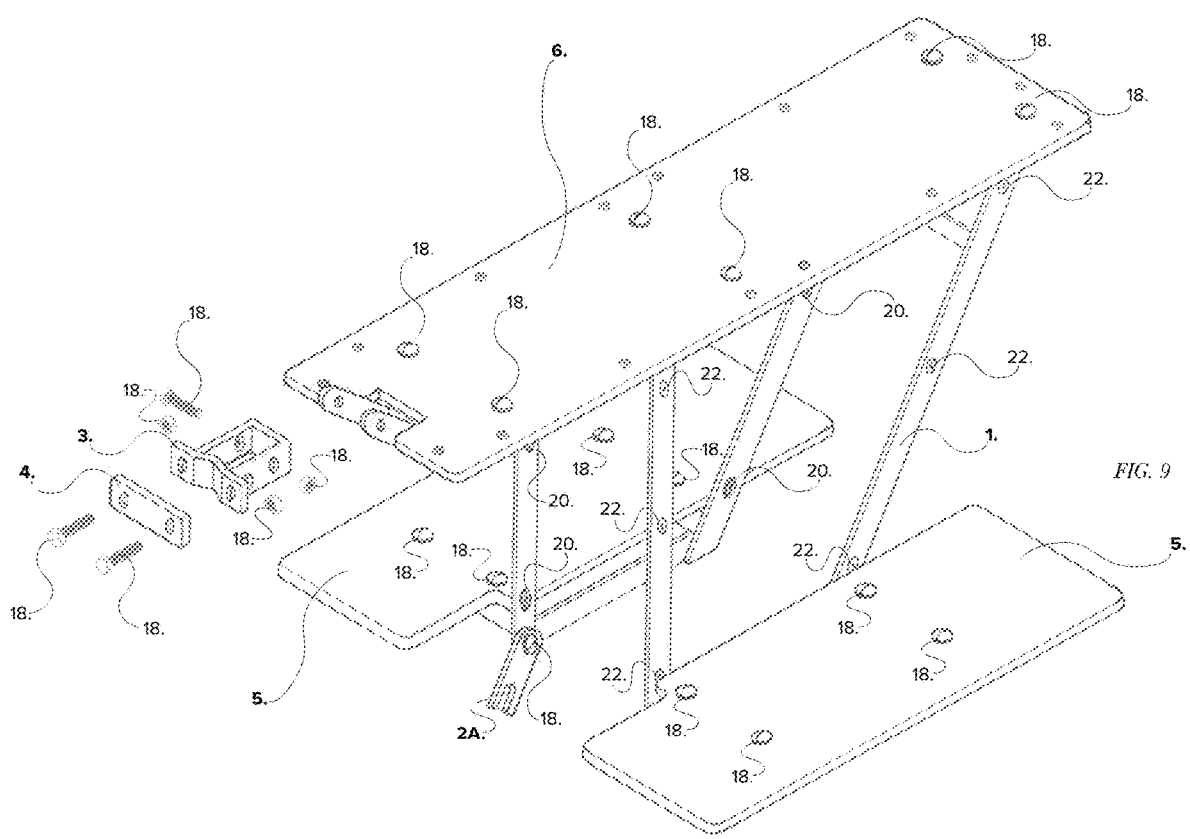
FIG. 9 shows a schematic illustration of the main frame together with the foot decks and the large cargo deck.

FIG. 8 shows a schematic illustration of a large cargo deck 6 in accordance with an embodiment of the present invention. The large cargo deck 6 extends substantially the length of the top platform 1A of the main frame 1. In alternative embodiments, the large cargo deck may extend beyond the length of the top platform. The large cargo deck 6 also comprises a series of holes, one or more of which align with holes provided on the top platform 1A. The large cargo deck 6 is secured to the main frame 1 via the one or more connectors 18. FIG. 9 shows a schematic illustration of the main frame 1 having assembled thereon the large cargo deck 6 on top of the top platform 1A using the connectors 18.

Figure 10:
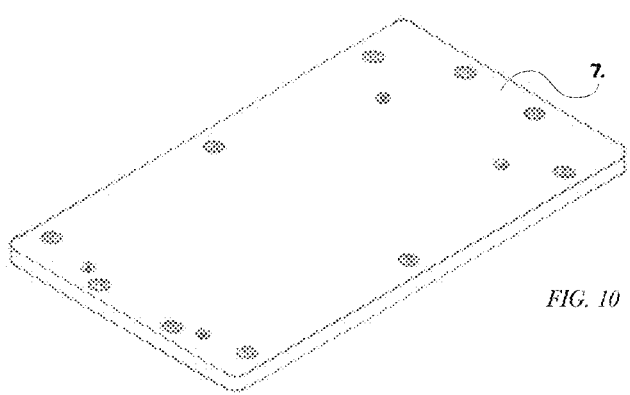
FIG. 10 shows a schematic illustration of a small cargo deck.
Figure 11:
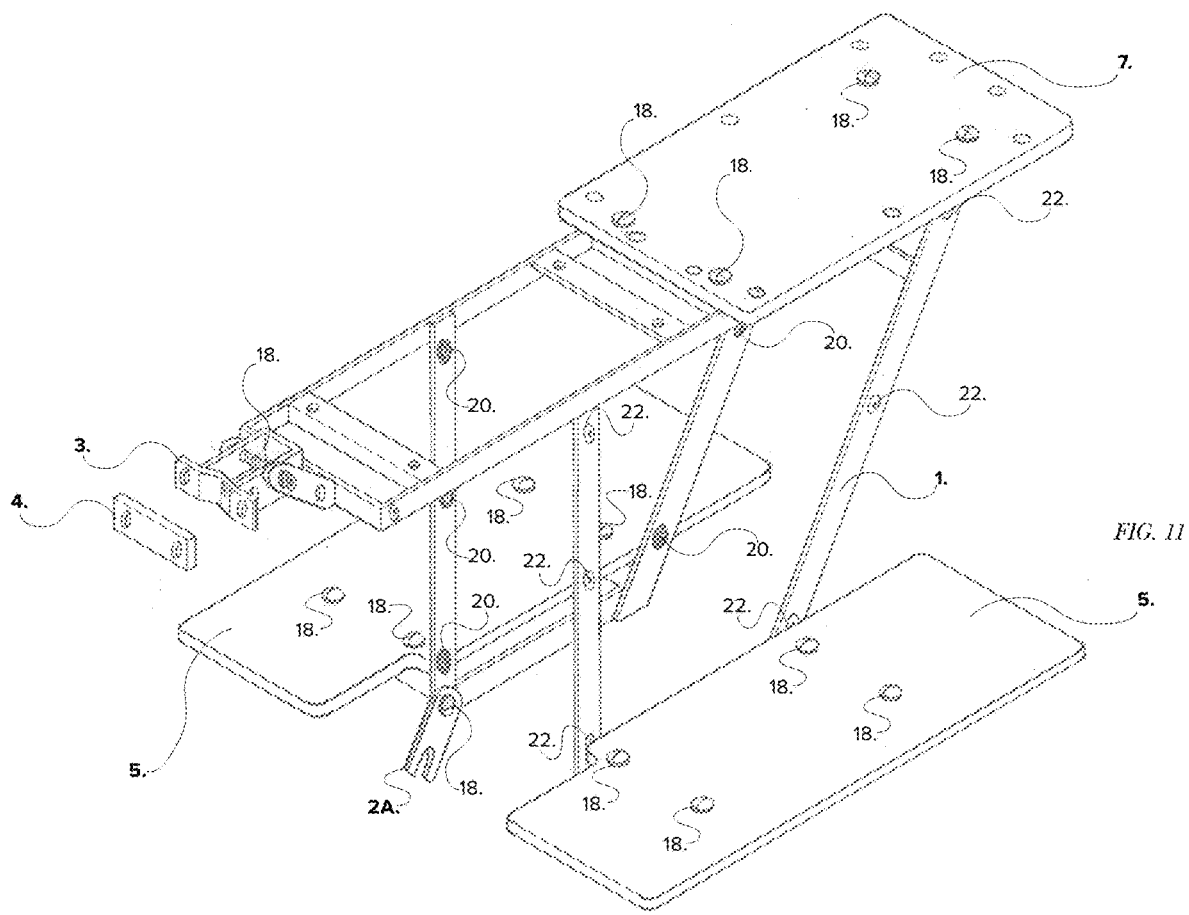
FIG. 11 shows a schematic illustration of the main frame together with the foot decks and the small cargo deck.

FIG. 10 shows a schematic illustration of a small cargo deck 7 in accordance with an embodiment of the present invention. The small cargo deck 7 is similar in structure with the large cargo deck 6, except that the small cargo deck 6 only extends for the length of one of the first and second sections of the top platform 1A. For example, the small cargo deck 7 may be positioned at the first section of the top platform 1A allowing another small cargo deck 7, or a different auxiliary device (e.g., a passenger seat or a saddle bag), to be positioned at the second section of the top platform 1A, or vice-versa. The small cargo deck 6 is also fastened to the top platform 1A of the main frame 1 via the connectors 18. FIG. 11 shows a schematic illustration of the main frame 1 having assembled thereon the small cargo deck 7 at the second position of the top platform 1A using the connectors 18.

Figure 12:
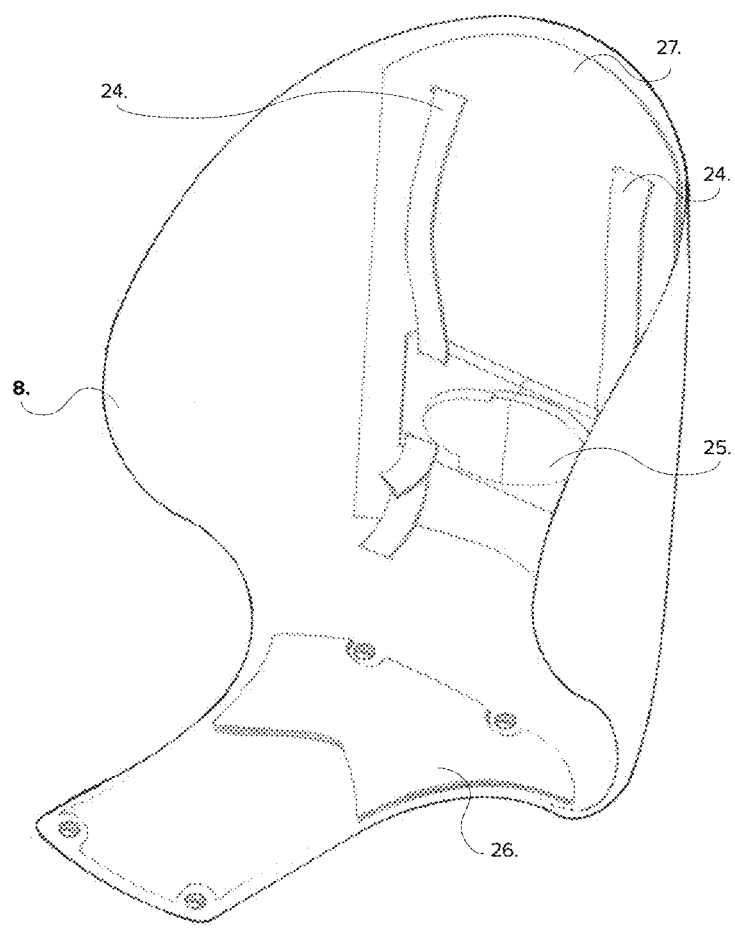
FIG. 12 shows a schematic illustration of a passenger seat.
Figure 13:
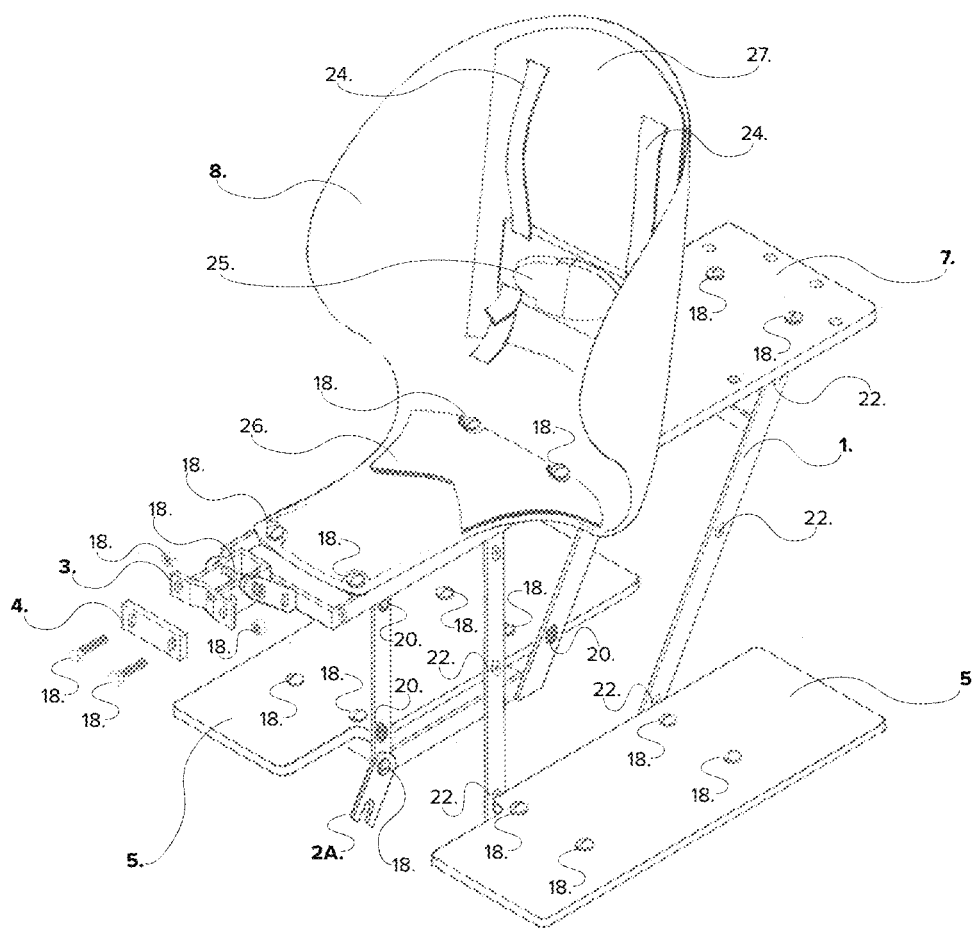
FIG. 13 shows a schematic illustration of the main frame together with the foot decks, the small cargo deck and the passenger seat.

FIG. 12 shows a schematic illustration of a passenger seat 8 in accordance with an embodiment of the present invention. The passenger seat 8 may comprise one or more of a cloth strap 24, a 4-point harness 25, a seat pad 26 and a back pad 27. The size of the passenger seat 8 is such that it fits within one of the first and second section of the top platform 1A. The passenger seat 8 is also fastened to the top platform 1A via the connectors 18. FIG. 13 shows a schematic illustration of the main frame 1 having assembled thereon the passenger seat 8 at the first position of the top platform 1A using the connectors 18. As will be illustrated in subsequent embodiments, the invention is not limited to the small cargo deck 7 being positioned at the second section and the passenger seat 8 being positioned at the first section of the top platform 1A. For a variety of purposes (e.g., convenience, safety, etc.) the passenger seat 8 may be positioned at the second section with or without the small cargo deck 7 being positioned at the first section of the top platform 1A. In other embodiments, the main frame 1 may accommodate the large cargo deck 6 and the passenger seat may be installed on top of the large cargo deck 6.

Figure 14:
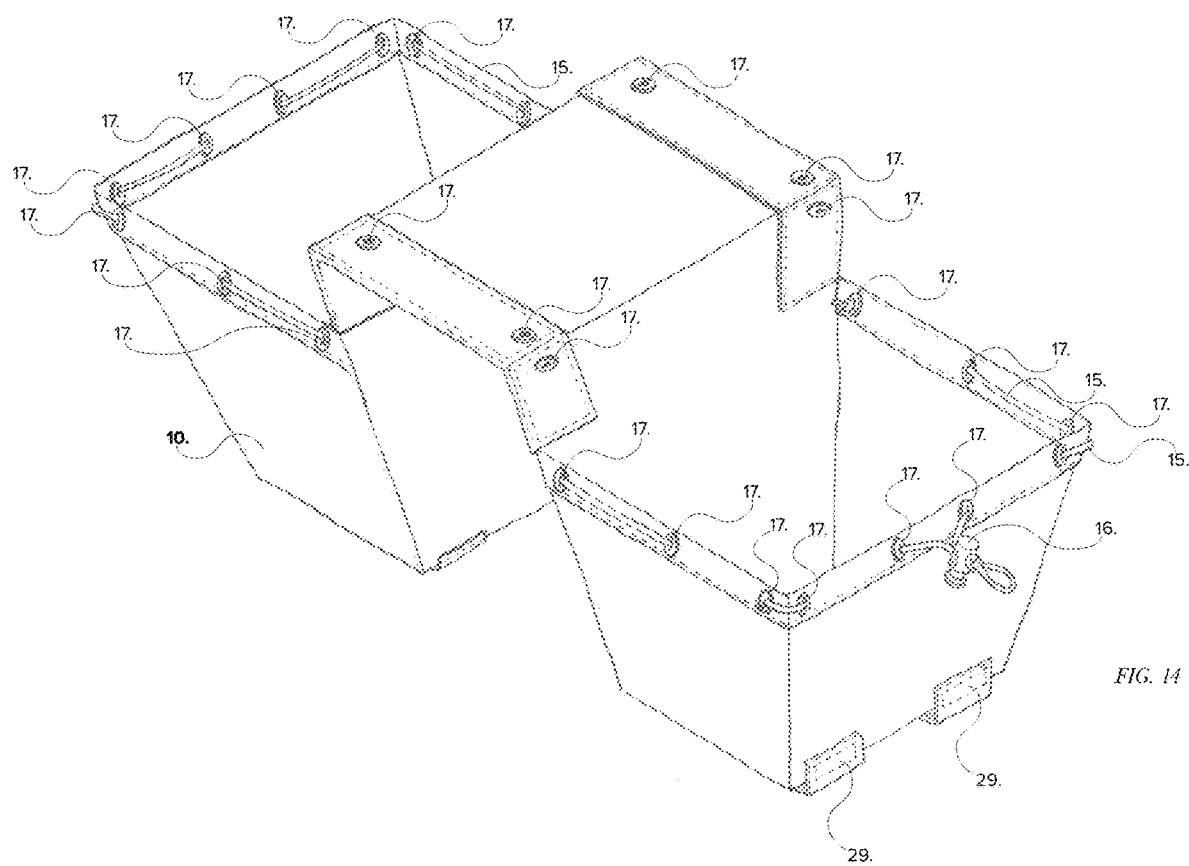
FIG. 14 shows a schematic illustration of a saddle bag.
Figure 15:
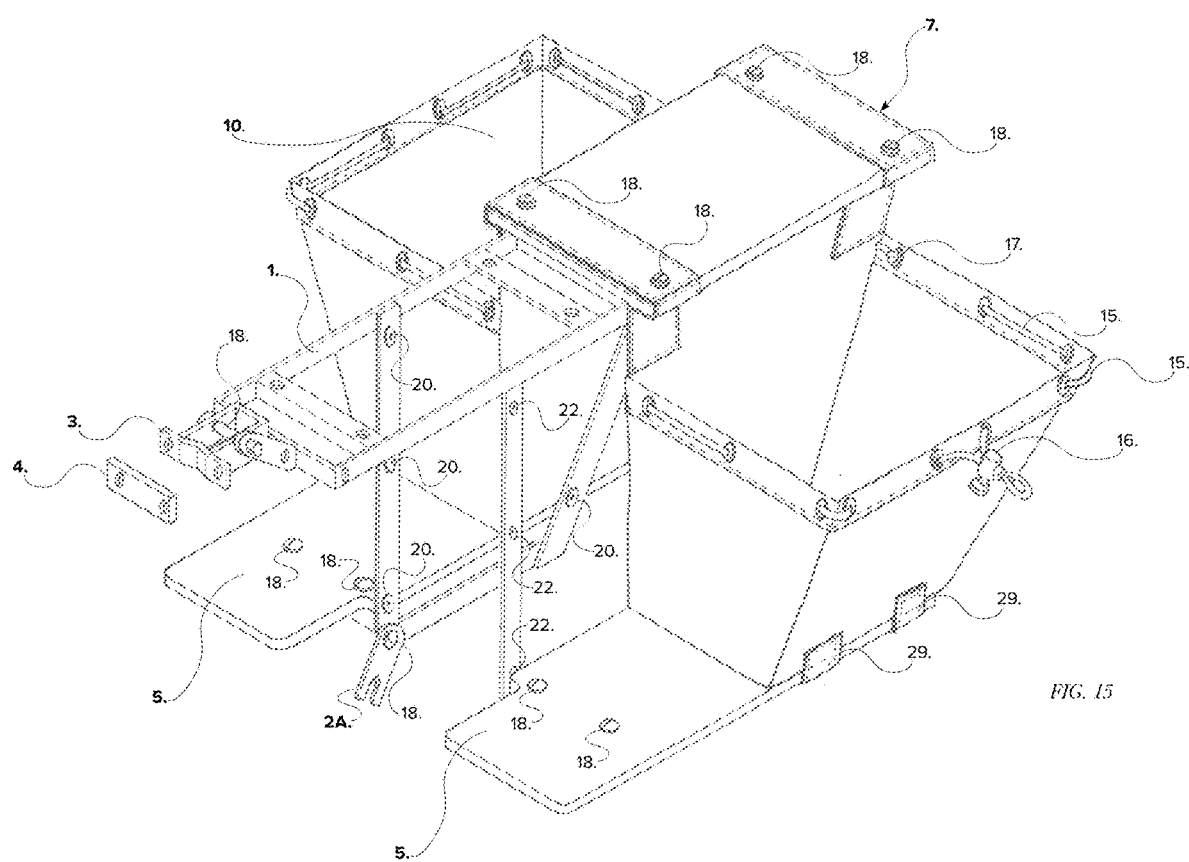
FIG. 15 shows a schematic illustration of the main frame together with the foot decks, the small cargo deck and the saddle bag.
Figure 16:
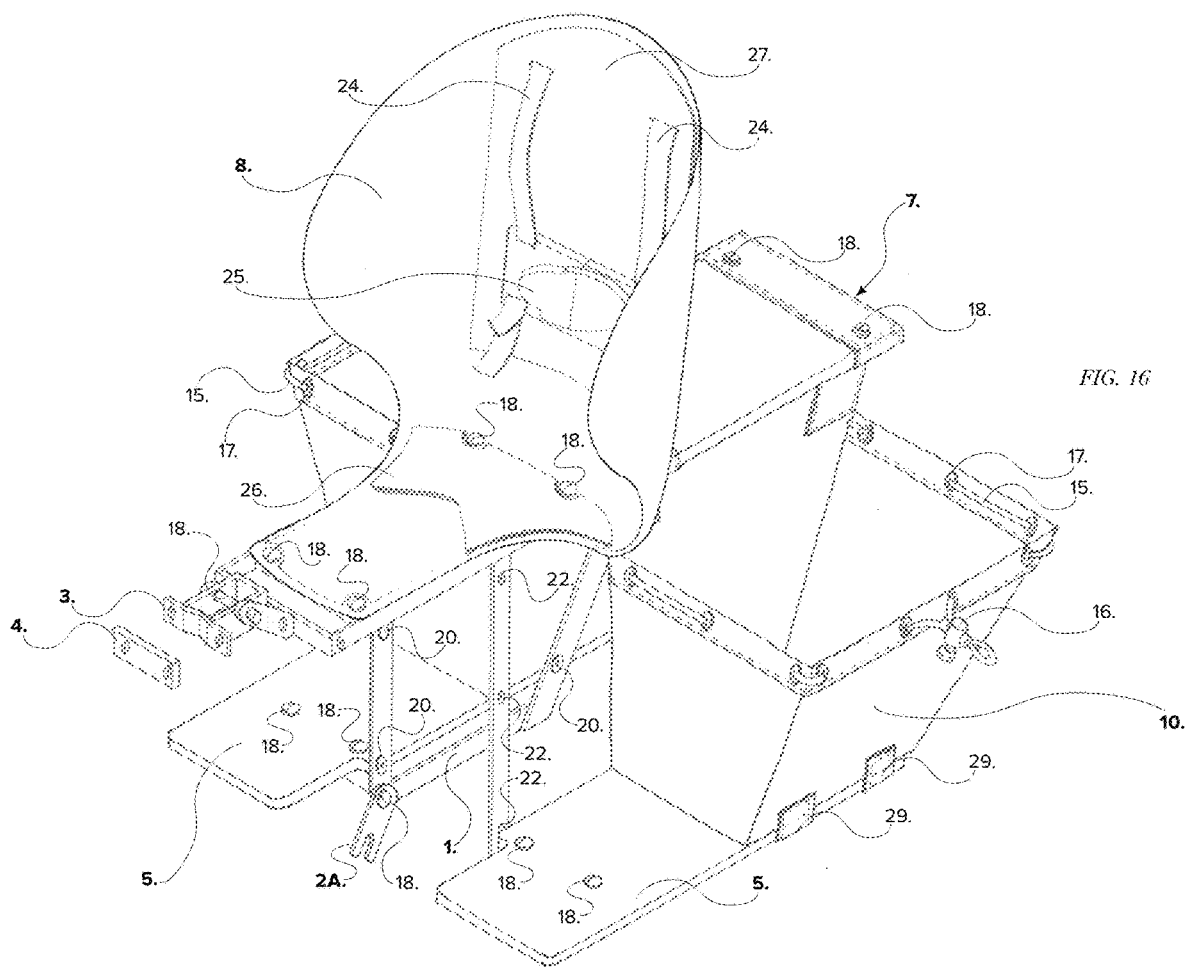
FIG. 16 shows a schematic illustration of the main frame together with the foot decks, the small cargo deck, the saddle bag and the passenger seat.

FIG. 14 shows a schematic illustration of a saddle bag 10 in accordance with an embodiment of the present invention. The saddle bag 10 is designed to be placed over the small cargo deck 7, the large cargo deck 6, or the top platform 1A of the main frame without the small cargo deck 7 or the large cargo deck 6. The center portion of the saddle bag 10 is a flat surface having an area that substantially matches the size of the first or section of the top platform 1A. The center portion of the saddle bag 10 comprises a series of metal rings 17 and the saddle bag is secured to the small cargo deck 7 or to the top platform 1A using the connectors 18 which protrude through the metal rings 17. The saddle bag further comprises two bagging portions, one on each side of the center portion. The two bagging portions provides a volume of space defined by the height of the main frame 1 and the width of the foot deck 5. Optionally, the two bagging portions are secured to the surface of respective foot decks via loop and hook strips 29. In alternative embodiments, the bagging portions may further comprise holes at the bottom allowing the connectors 18 to secure the bagging portions to the respective foot decks. The open top of the bagging portions of the saddle bag 10 may be partially or fully closed using cords 15 and cord stops 16. FIG. 15 shows a schematic illustration of the main frame 1 having assembled thereon the saddle bag 10 at the second position of the top platform 1A using the connectors 18 and FIG. 16 shows a schematic illustration of the main frame 1 having assembled thereon the saddle bag 10 at the second position of the top platform 1A and the passenger seat 8 at the first position of the top platform 1A. As mentioned earlier, the relative position of the saddle bag 10 and the passenger seat 8 on the top platform 1A may be interchanged.

In accordance with the embodiments of the present invention, providing a saddle bag that includes bagging portions defined by the size of the main frame and secured to the foot decks provides an advantage of maximizing capacity and stability for articles to be carried while riding a bicycle. For example, the saddle bag 10 remains firm and fixed to the main frame 1, along with any articles contained therein, throughout any abrupt maneuver due to the loop and hook strips 29 or the connectors 18 preventing wobbling of the saddle bag 10.

Figure 17:
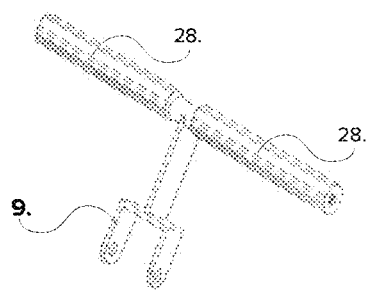
FIG. 17 shows a schematic illustration of a T-handle.
Figure 18:
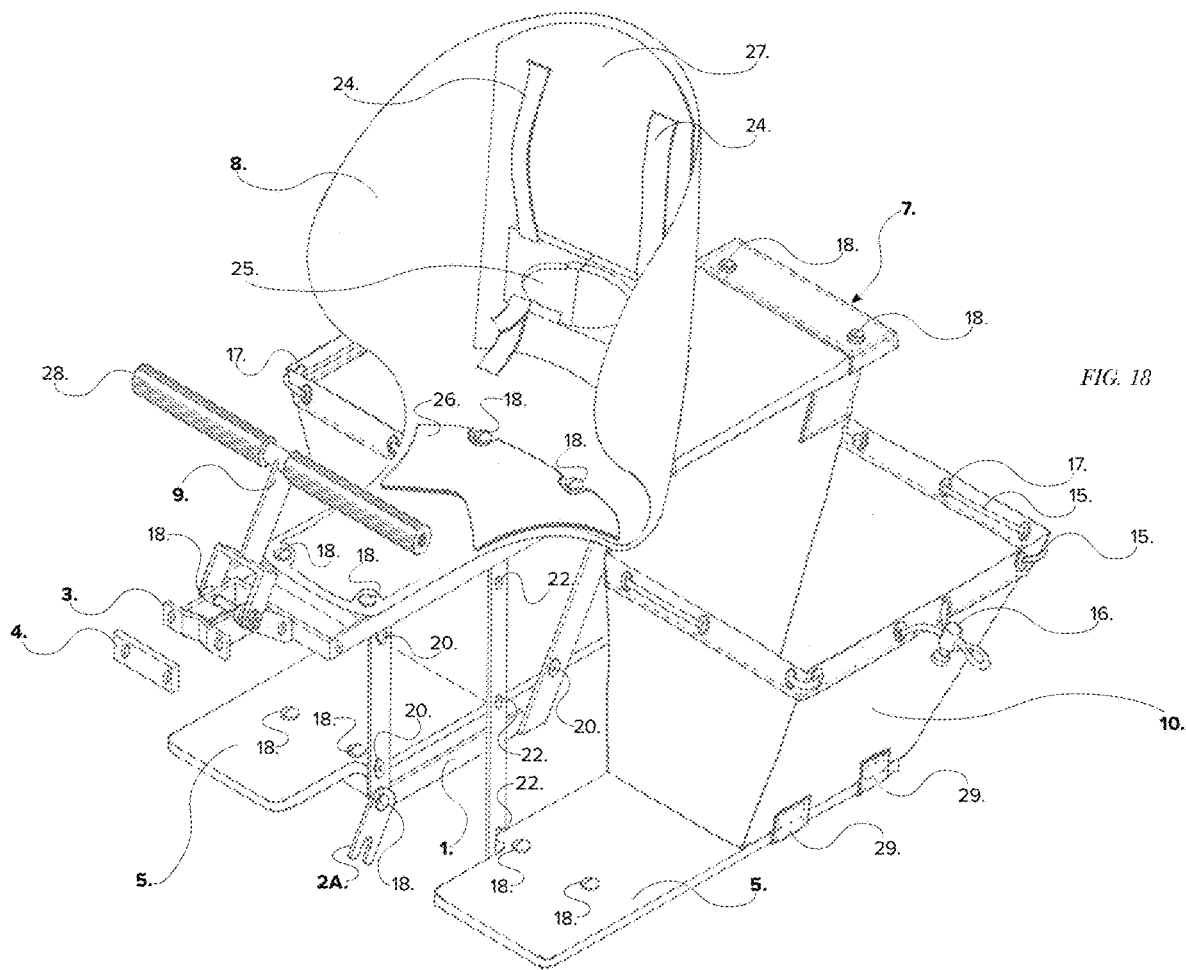
FIG. 18 shows a schematic illustration of the main frame together with the foot decks, the small cargo deck, the saddle bag, the passenger seat and the T-handle.

FIG. 17 shows a schematic illustration of a T-Handle 9 in accordance with an embodiment of the present invention. The T-Handle 9 comprises a pair of cushion grips 28 and is attached to the back portion 3 of the seat post bracket. FIG. 18 shows a schematic illustration of the main frame 1 having attached thereto the T-Handle 9 on the back portion 3 of the seat post bracket. As shown in FIG. 18, the T-Handle 9 is intended for the passenger who sits in the passenger seat 8 positioned at the first section of the top platform 1A. In an alternative embodiment in which the passenger seat 8 is positioned at the second section of the top platform 1A, the length of the T-Handle 9 may extend from the seat post bracket to the passenger who sits at the second section of the top platform 1A.

Figure 19:
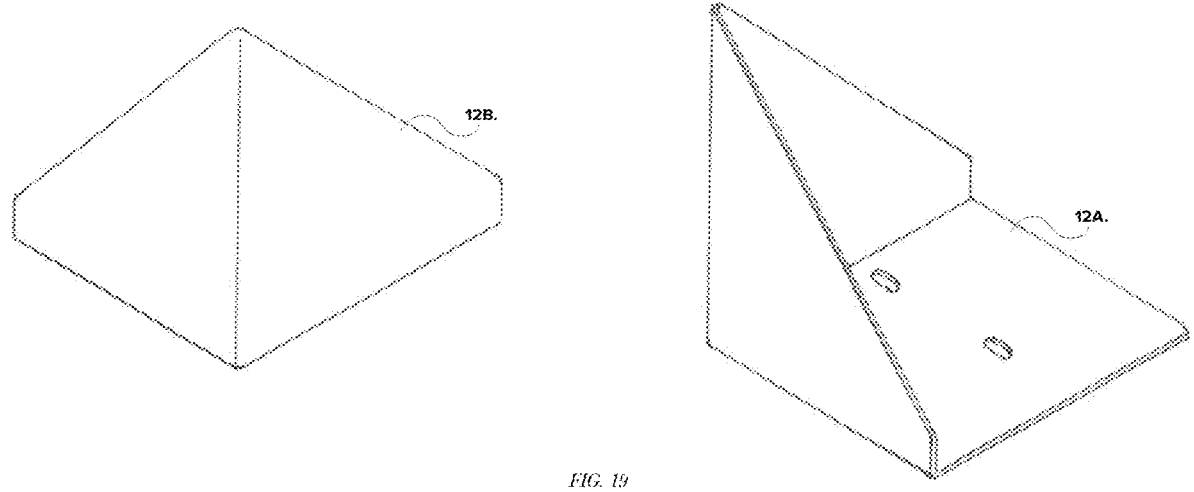
FIG. 19 shows a schematic illustration of single foot guards.
Figure 20:
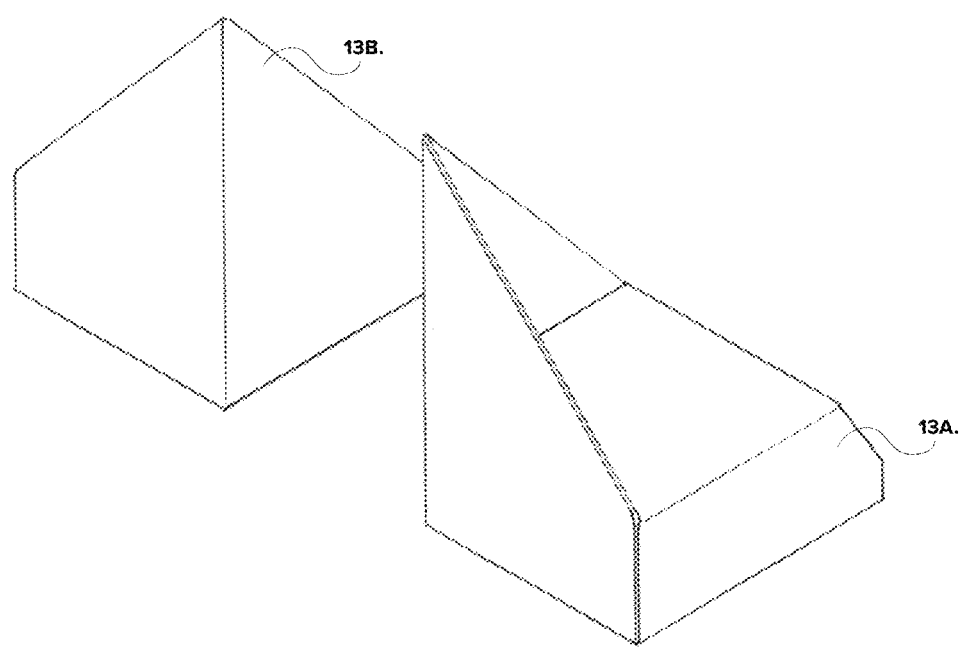
FIG. 20 shows a schematic illustration of double foot guards.
Figure 21:
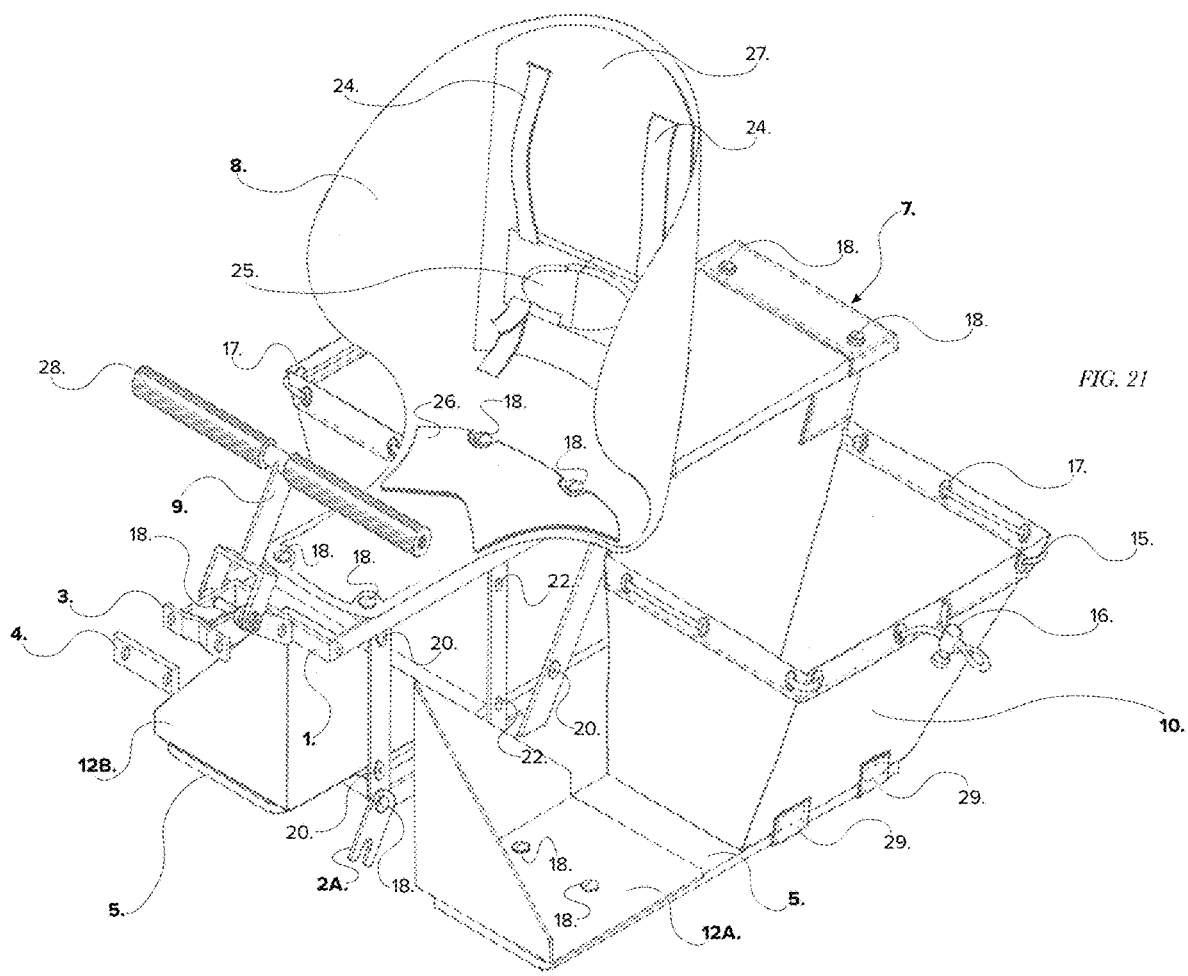
FIG. 21 shows a schematic illustration of the main frame together with the foot decks, the small cargo deck, the saddle bag, the passenger seat, the T-handle and a pair of single foot guards.
Figure 22:
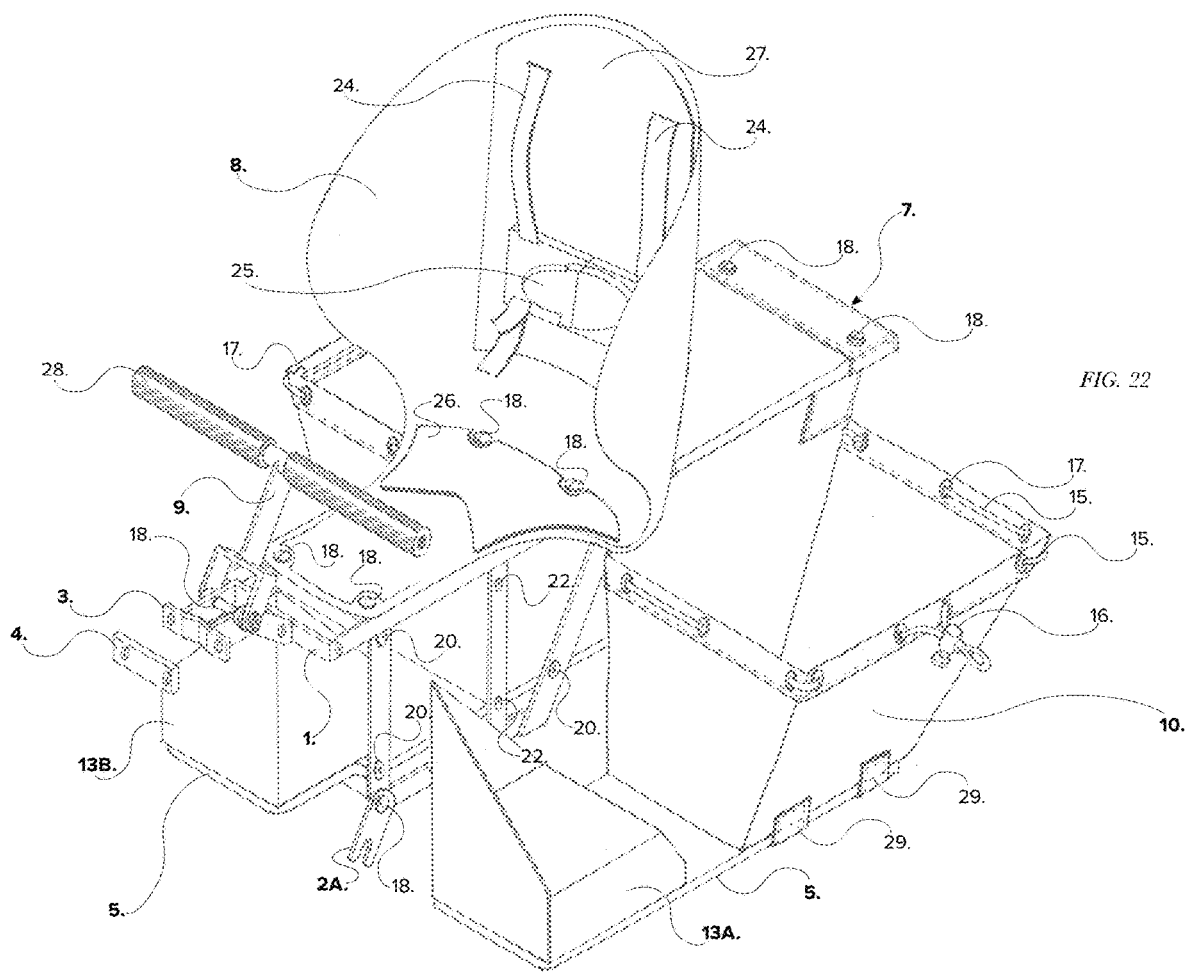
FIG. 22 shows a schematic illustration of the main frame together with the foot decks, the small cargo deck, the saddle bag, the passenger seat, the T-handle and a pair of double foot guards.
Figure 23:
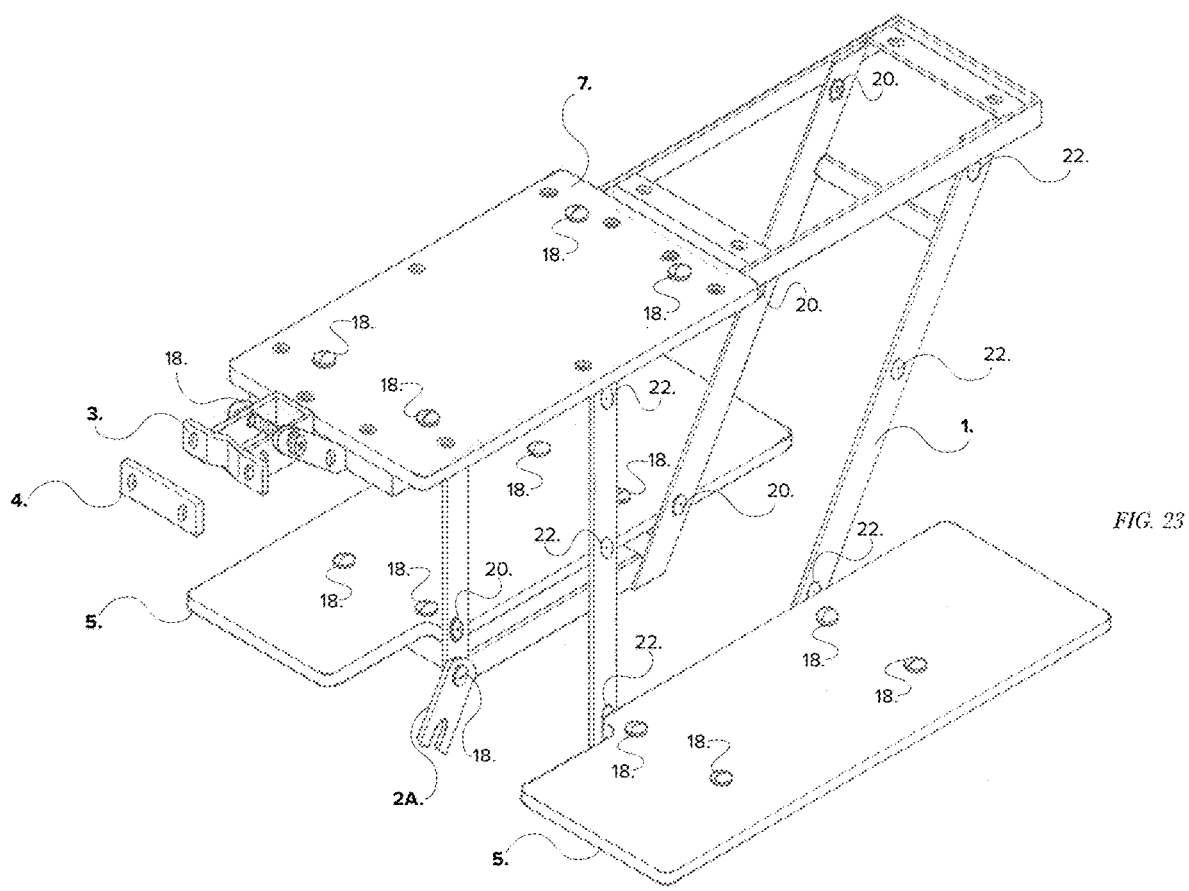
FIG. 23 shows a schematic illustration of the main frame together with the foot decks and the small cargo deck in accordance with a further embodiment of the present invention.
Figure 24:
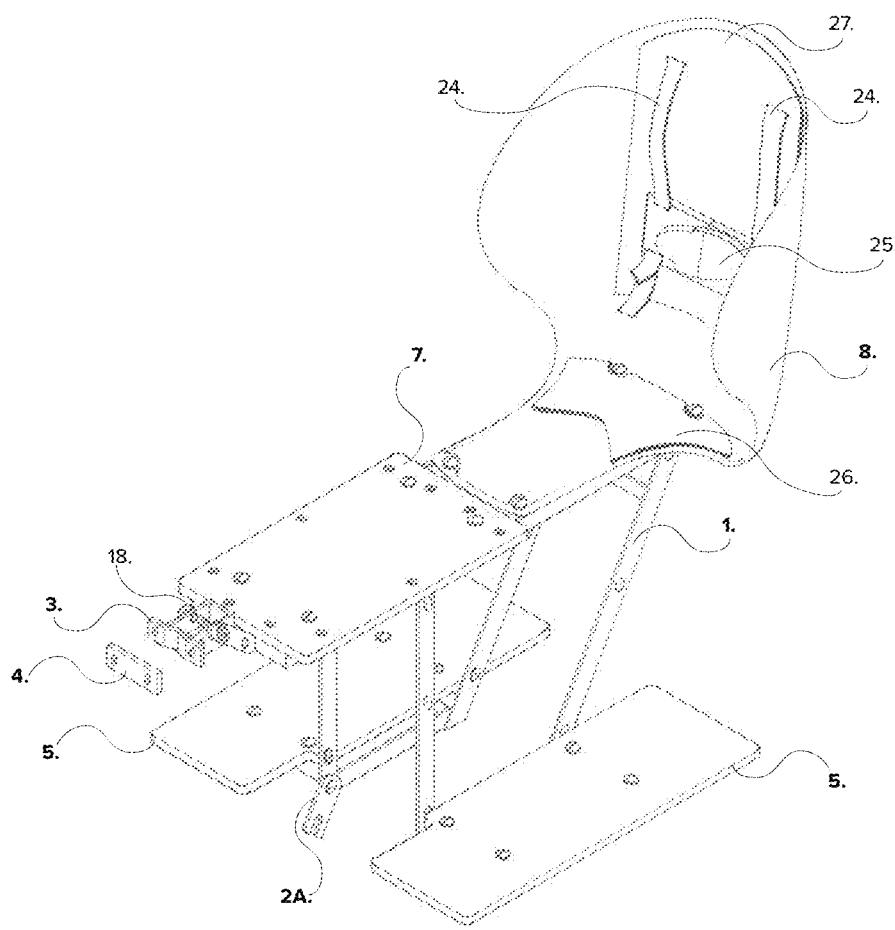
FIG. 24 shows a schematic illustration of the main frame together with the foot decks, the small cargo deck and the passenger seat.
Figure 25:
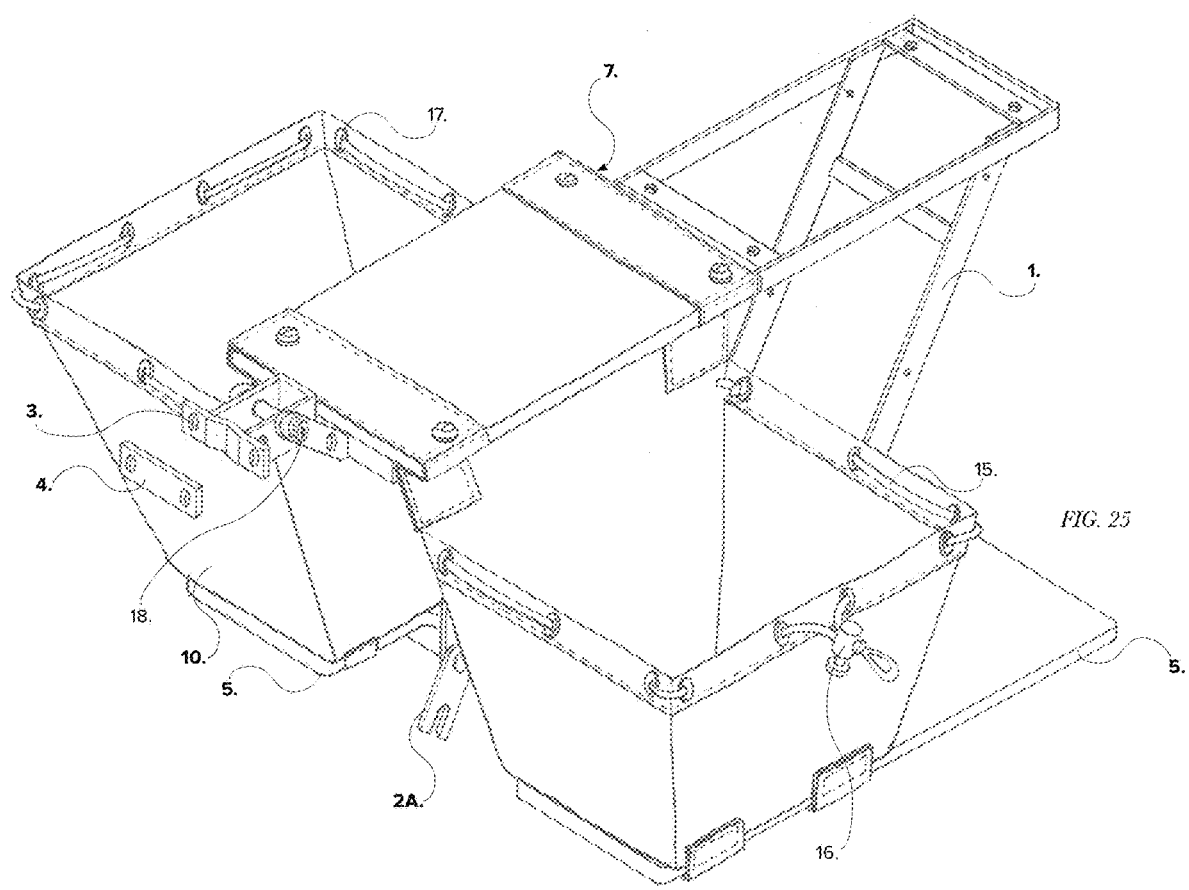
FIG. 25 shows a schematic illustration of the main frame together with the foot decks, the small cargo deck and the saddle bag.
Figure 26:
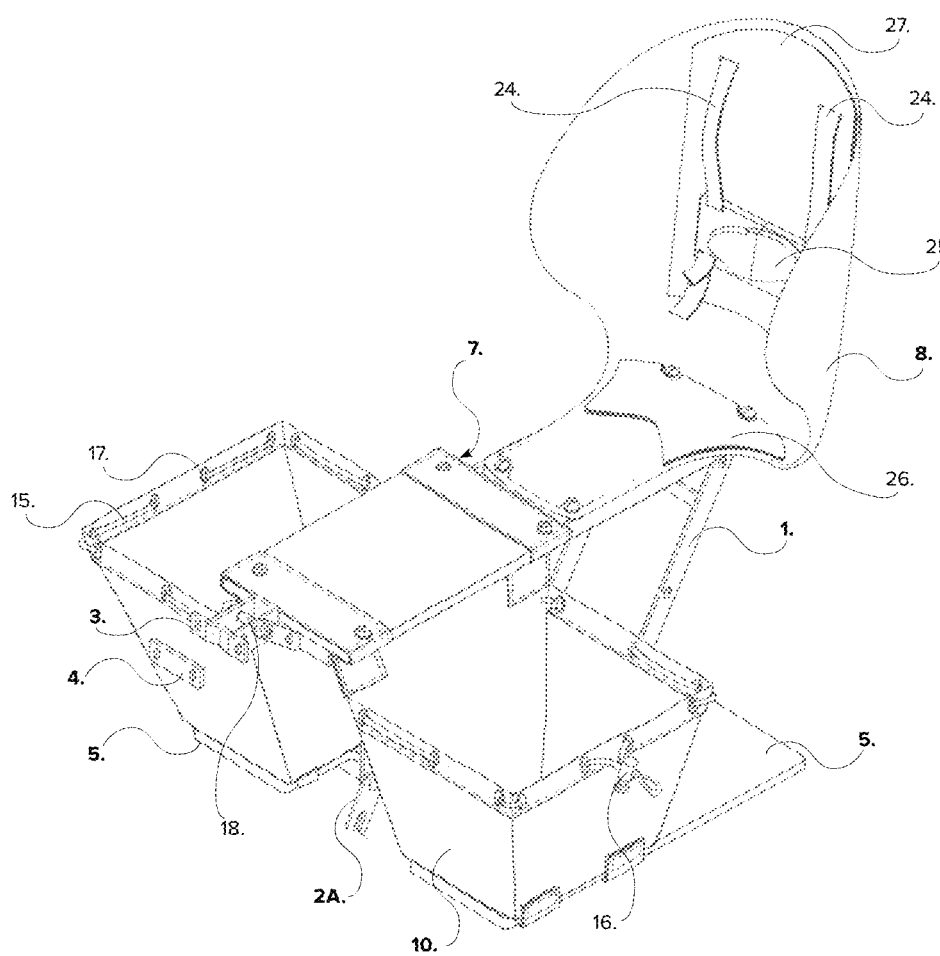
FIG. 26 shows a schematic illustration of the main frame together with the foot decks, the small cargo deck, the saddle bag and the passenger seat.

FIGS. 19 and 20 show schematic illustrations of foot guards in accordance with an embodiment of the present invention. In particular, FIG. 19 shows a pair of single foot guards 12A and 12B which provides front and side coverage for a passenger's feet. FIG. 20 shows a pair of double foot guards 13A and 13B which provides front, side and top coverage for the passenger's feet. The size for either the single or double foot guards may vary to accommodate the passenger's feet, but in a preferred embodiment, an individual foot guard is small enough such that two of such foot guards may rest on a single foot deck. In alternative embodiments, the size of the foot deck may be varied to accommodate the size of the foot guards. The single foot guards 12A and 12B or the double foot guards 13A and 13B are secured to the respective foot decks 5 via the connectors 18. FIGS. 21 and 22 show schematic illustrations of the main frame 1 having attached thereto, the single foot guards 12A and 12B or the double foot guards 13A and 13B.

In the foregoing embodiments, which may collectively be referred to as "a first embodiment" of the present invention, the bicycle rack system comprises, for example, a main frame 1, a pair of foot decks 5, a small cargo deck 7, a passenger seat 8, a T-Handle 9, a saddle bag 10 and a pair of foot guards (12 or 13), all of which are assembled using the same set of connectors 18. By configuring a bicycle rack system in which all of its constituents can be assembled (or disassembled) using a uniform set of tools (i.e., the connectors 18), the time and effort needed to assemble such system have been drastically reduced. Moreover, an apparent advantage of the first embodiment of the present invention is the usage of a single main frame which supports auxiliary devices for carrying both articles and a passenger in a firm and secure manner.

Figure 27:
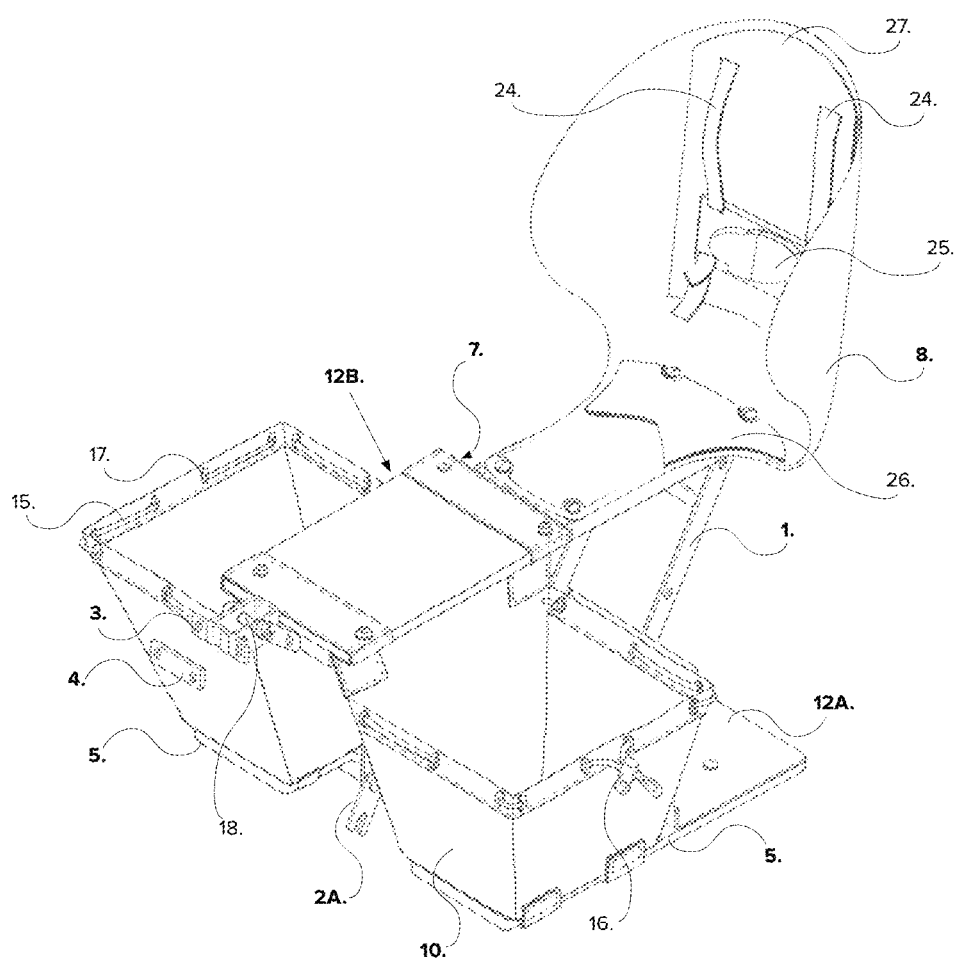
FIG. 27 shows a schematic illustration of the main frame together with the foot decks, the small cargo deck, the saddle bag, the passenger seat and the pair of single foot guards.
Figure 28:
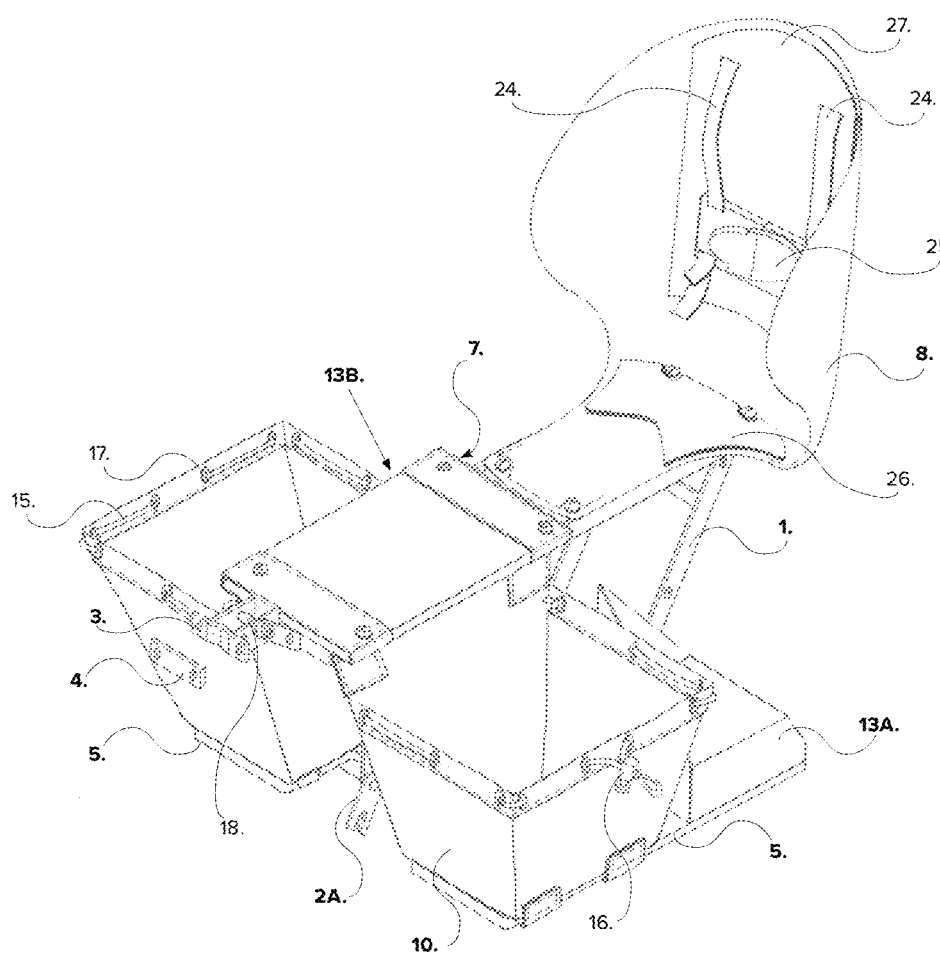
FIG. 28 shows a schematic illustration of the main frame together with the foot decks, the small cargo deck, the saddle bag, the passenger seat and the pair of double foot guards.
Figure 29:
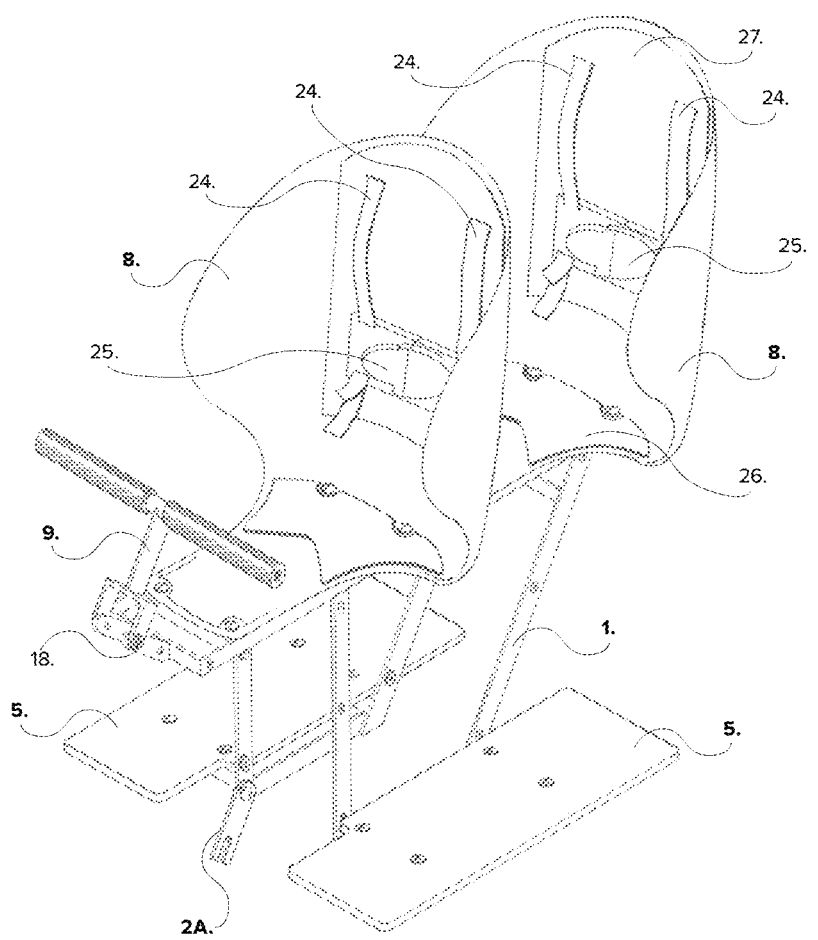
FIG. 29 shows a schematic illustration of the main frame together with the foot decks, a first passenger seat, a second passenger seat and the T-handle.
Figure 30:
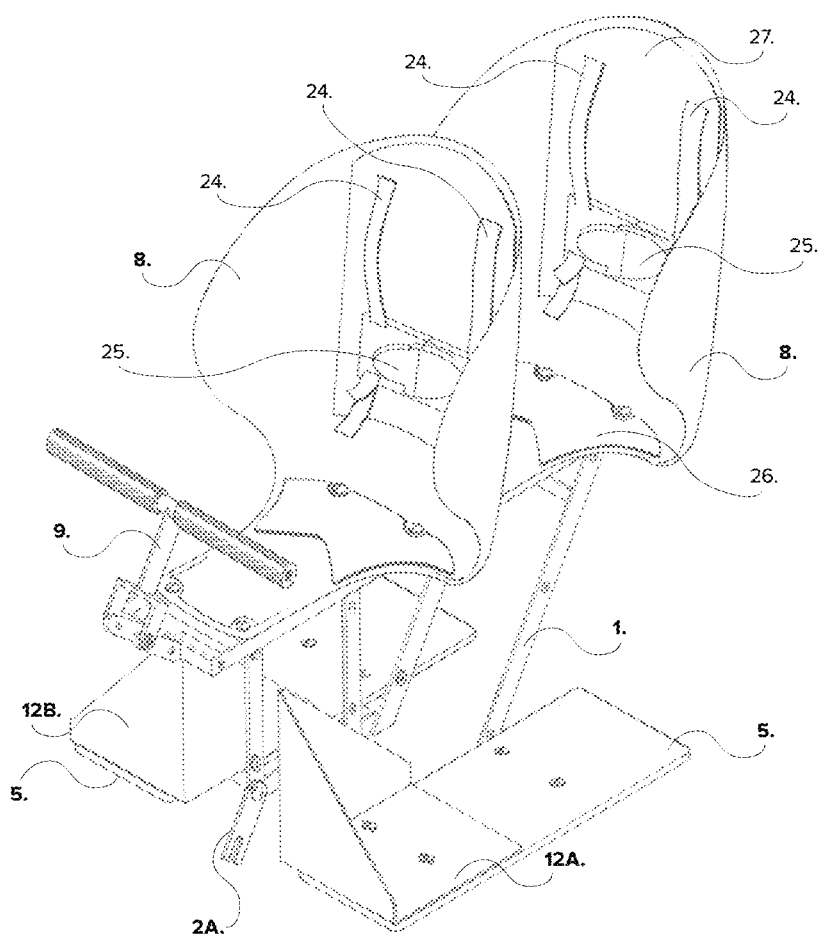
FIG. 30 shows a schematic illustration of the main frame together with the foot decks, the first passenger seat, the second passenger seat, the T-handle and a first pair of single foot guards.
Figure 31:
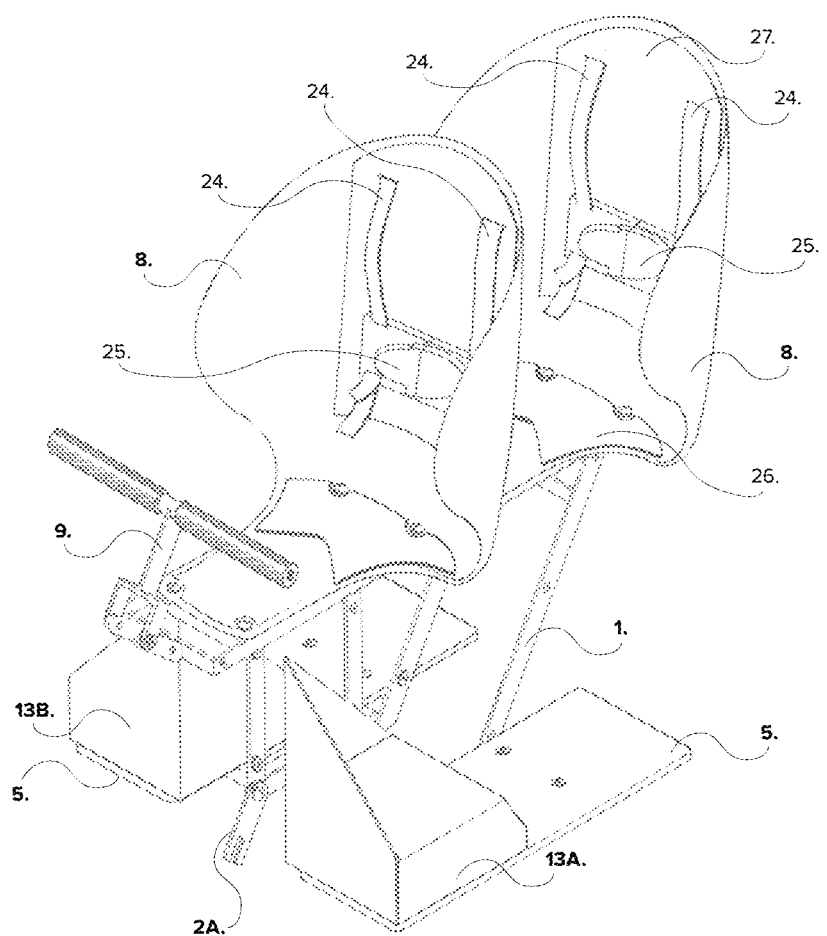
FIG. 31 shows a schematic illustration of the main frame together with the foot decks, the first passenger seat, the second passenger seat, the T-handle and a first pair of double foot guards.
Figure 32:
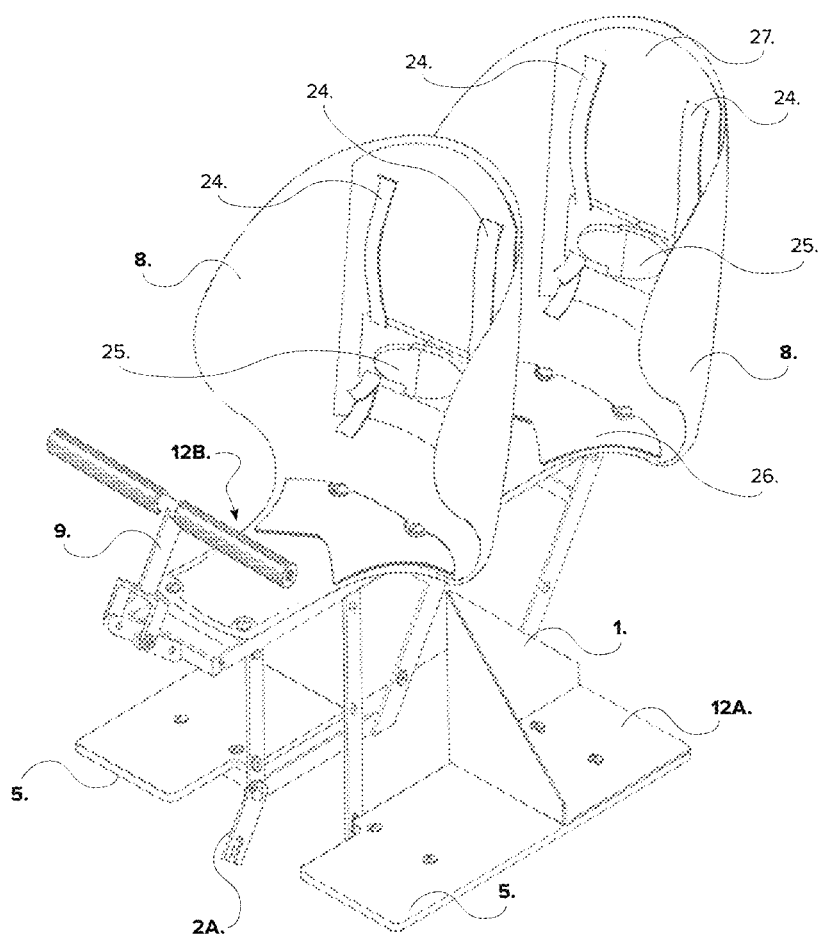
FIG. 32 shows a schematic illustration of the main frame together with the foot decks, the first passenger seat, the second passenger seat, the T-handle and a first pair of single foot guards.
Figure 33:
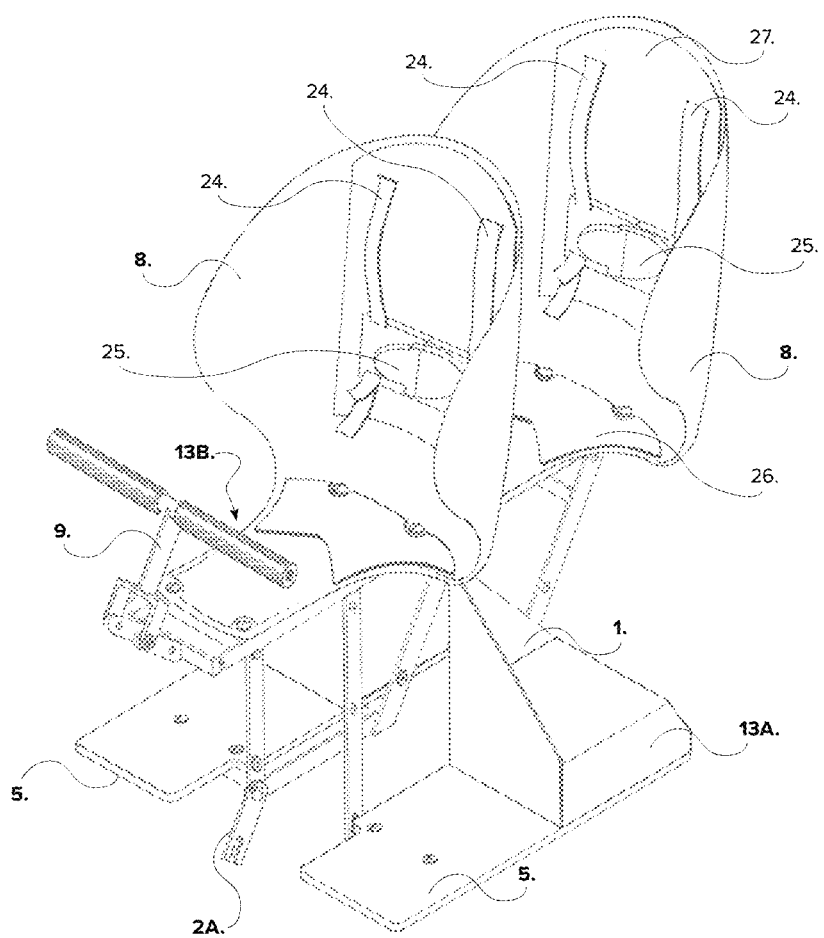
FIG. 33 shows a schematic illustration of the main frame together with the foot decks, the first passenger seat, the second passenger seat, the T-handle and a double pair of single foot guards.
Figure 34:
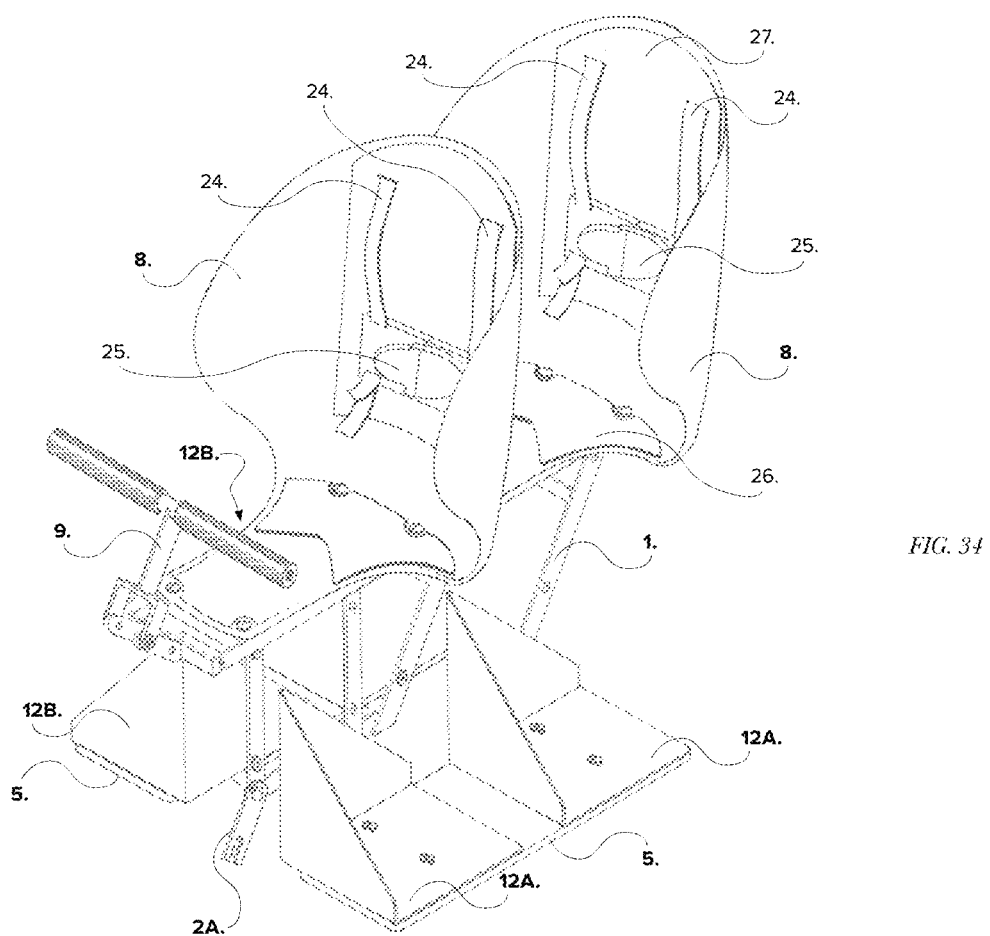
FIG. 34 shows a schematic illustration of the main frame together with the foot decks, the first passenger seat, the second passenger seat, the T-handle, the first pair of single foot guards and a second pair of single foot guards.
Figure 35:
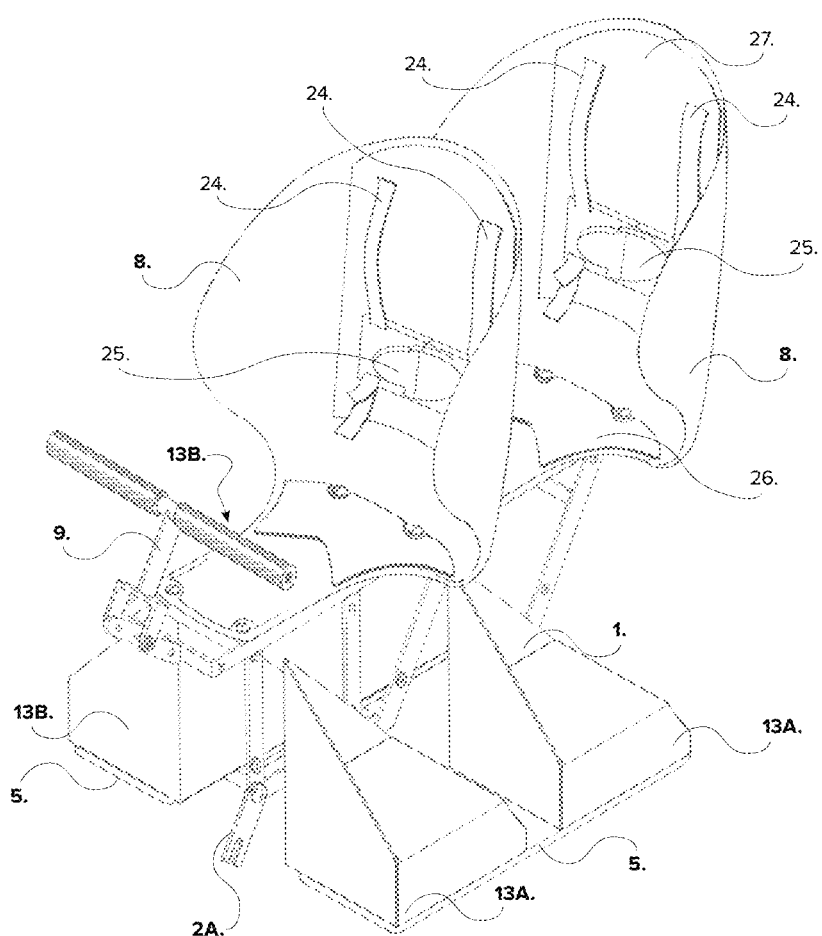
FIG. 35 shows a schematic illustration of the main frame together with the foot decks, the first passenger seat, the second passenger seat, the T-handle, the first pair of double foot guards and a second pair of double foot guards.

FIGS. 23-28 illustrate a second embodiment of a bicycle rack system in accordance with the present invention. The main frame 1 of the second embodiment utilizes the same elements as discussed above with respect to the first embodiment of the present invention. The second embodiment differs from the first embodiment in that the passenger seat 8 is positioned at the second section of the top platform 1A. One of the advantages of this configuration is providing more leg room for the passenger. FIGS. 27 and 28 show schematic illustrations of the fully assembled bicycle rack system in accordance with the second embodiment of the present invention.

FIGS. 29-35 illustrate a third embodiment of a bicycle rack system in accordance with the present invention. The main frame 1 of the third embodiment utilizes the same elements as discussed above with respect to the first embodiment of the present invention. The third embodiment differs from the first or second embodiments in that two passenger seats 8 are installed on the top platform 1A. The passenger seats 8, as discussed above, may be installed directly on the top platform 1A, or on a cargo deck such as a large cargo deck 6 or respective small cargo decks 7. In this embodiment, a T-Handle 9 is provided only at the seat post bracket for the passenger riding in the passenger seat positioned at the first section. The passenger riding in the passenger seat positioned at the second section may grab onto the passenger seat positioned at the first section. Alternatively, another T-Handle 9 may be provided on the rear side of the passenger seat positioned at the first section. The second T-Handle may also be installed using the connectors 18.

Figure 36:
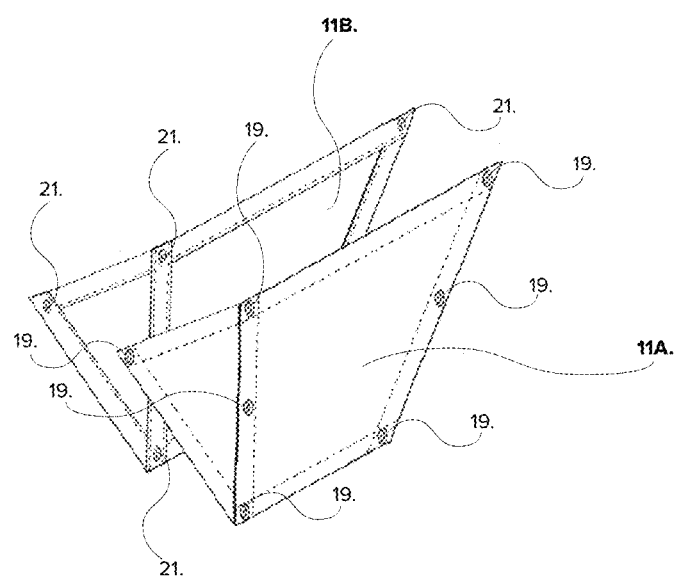
FIG. 36 shows a schematic illustration of a wheel cover in accordance with a further embodiment of the present invention.
Figure 37:
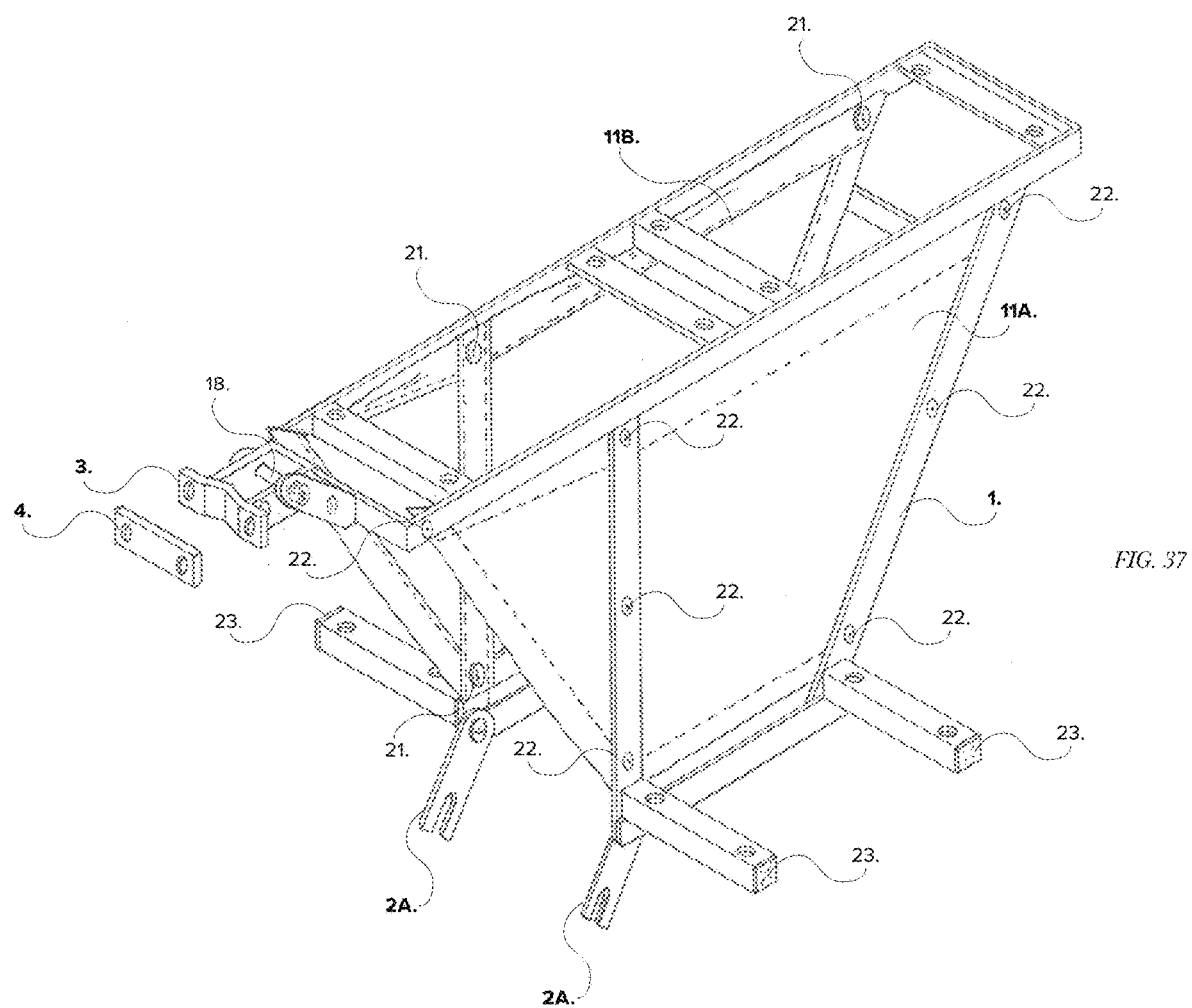
FIG. 37 shows a schematic illustration of the main frame together with the wheel cover.

In accordance with either the first, second or third embodiment, or in accordance with any variations of the foregoing embodiments, the bicycle rack system may further comprise a wheel cover or a frame cargo pack. FIG. 36 shows a schematic illustration of a wheel cover 11 in accordance with the present invention. The wheel cover left 11A and the wheel cover right 11B, as shown in FIG. 36, each has a plurality of snap males and females which allow the wheel covers to be easily snapped onto the main frame 1. In alternative embodiments, the wheel covers may be attached to the main frame using similar adhesives (e.g., adhesive felt strips, dry adhesives, and etc.). The wheel covers can protect a passenger's feet from coming in contact with wheel spokes. FIG. 37 shows a schematic illustration of the main frame 1 having attached thereto, a pair of wheel covers 11A and 11B. FIG. 37 shows the wheel covers being attached to the inner portions of the vertical support bars 1B, but an alternative embodiment can have the wheel covers on the exterior portions of the vertical support bars 1B.

Figure 38:
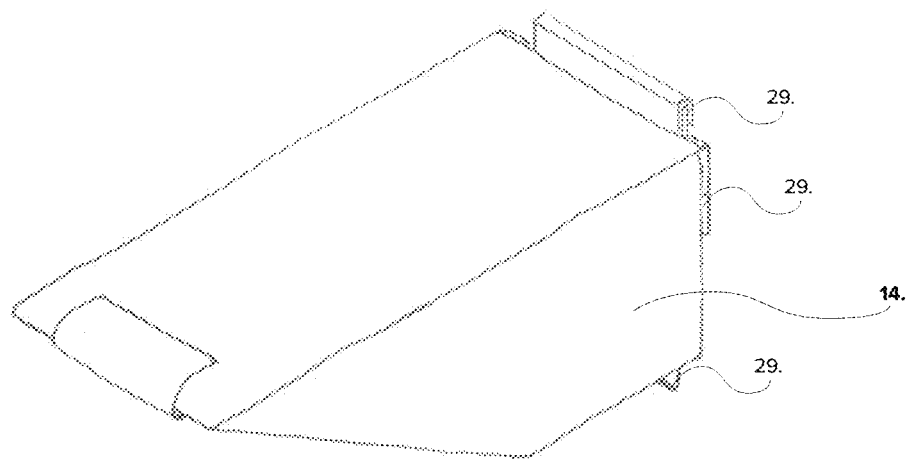
FIG. 38 shows a schematic illustration of a cargo frame pack in accordance with a further embodiment of the present invention.

FIG. 38 shows a schematic illustration of a cargo pack 14. The cargo pack 14 is generally attached to an underside of the top platform 1A of the main frame 1 to provide additional storage area for articles. In accordance with the third embodiment of the present invention in which two passenger seats 8 are installed on the top platform, the cargo pack 14 can provide rooms below the passenger seats for storing items. The cargo pack 14 may be attached using hook and loop strips 29, or other similar techniques discussed above. The cargo pack 14 may be attached either in the first section or the second section of the top platform 1A or there may be two cargo packs 14, one in each section, as long as the depth of the cargo pack 14 installed in the first section do not come in contact with the rear wheel of the bicycle. In some embodiments, the cargo pack below the first section may be smaller than the cargo pack below the second section.

Figure 39:
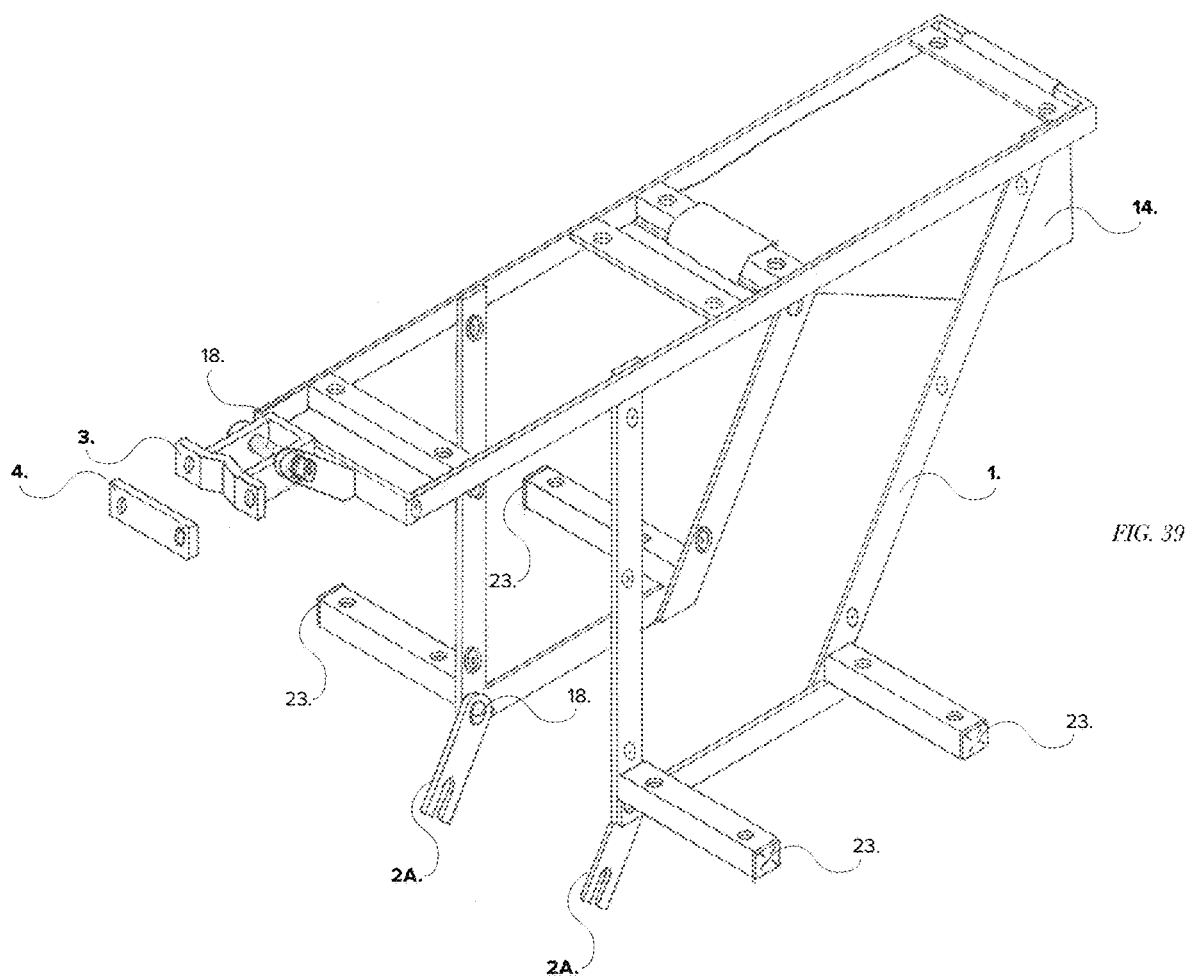
FIG. 39 shows a schematic illustration of the main frame together with the cargo frame pack.

FIG. 39 shows a schematic illustration of the main frame 1 having assembled thereon the cargo frame 14 underneath the second section of the top platform 1A using hook and loop strips.

FIG. 40 shows an exemplary bicycle 30 having secured therewith the bicycle rack system in accordance with the present invention. As described herein, the main frame 1 of the bicycle rack system attaches to the bicycle 30 at two locations: 1) at the seat post, and 2) at the hub of the rear wheel. FIG. 41 is a close-up view on the rear of the bicycle 30 more clearly illustrating the connection of the main frame to the seat post and the rear wheel axle.

In the foregoing description, certain terms have been used for brevity, clearness, and understanding. No unnecessary limitations are to be implied therefrom beyond the requirement of the prior art because such terms are used for descriptive purposes and are intended to be broadly construed. It is understood that while certain forms of the present invention have been illustrated and described herein, it is not to be limited to the specific forms or arrangements of parts described and shown. Modifications can be made in the structure of the main frame without departing from the scope and purview of the invention as defined in the appended claims

ELEMENTS LIST

1. Main frame
2A. Axle bracket
2B. Double end axle bracket
3. Seat post bracket back
4. Seat post bracket front
5. Foot deck
6. Large cargo deck
7. Small cargo deck
8. Passenger seat
9. T-Handle
10. Saddle bag
11A. Wheel cover left
11B. Wheel cover right
12A. Single foot guard left
12B. Single foot guard right
13A. Double foot guard left
13B. Double foot guard right
14. Frame cargo pack
15. Cord
16. Cord stop
17. Metal ring
18. Connector
19. Snap female
20. Snap male
21. Snap backer
22. Rivet
23. Square end-cap
24. Cloth strap
25. 4-point harness
26. Seat pad
27. Back pad
28. Cushion grip
29. Loop and hook strip
30. Bicycle

The invention claimed is:

1. A bicycle rack system, comprising:
a main frame configured to be mounted over a rear wheel of a bicycle,
wherein the main frame comprises:
a top platform for accommodating one or more first auxiliary devices, the top platform having a first platform section and a second platform section, at least one of the first and second platform sections configured to accommodate a respective first auxiliary device, wherein the top platform has a side support defining a side edge of the first and second platform sections, extending rearwardly beyond a rear-most outer periphery of the rear wheel of the bicycle, and parallel to a ground surface when a font wheel of the bicycle and the rear wheel of the bicycle contact the ground surface, and wherein the side support is configured to detachably mount a pair of passenger seats rearward of a primary seat of the bicycle;
a lower deck for accommodating one or more second auxiliary devices, the lower deck having a first deck section and a second deck section, wherein at least one of the first and second deck sections is configured to accommodate a respective second auxiliary device;
a plurality of support members connecting the side support of the top platform and the lower deck; and
a lateral member connecting the plurality of support members,
wherein the plurality of support members, the lateral member, and a portion of the side support together define a trapezoidal portion of the main frame disposed rearward of an axle of the rear wheel and configured to support at least one of the pair of passenger seats.

2. The bicycle rack system of claim 1, wherein:
the first platform section is one of the two platform sections closer to a front end of the top platform and the second platform section is the other of the two platform sections closer to a rear end of the top platform; and
the first deck section is one of the two decks sections that is closer to a front end of the lower deck and the second deck section is the other of the two deck sections that is closer to a rear end of the lower deck.

3. The bicycle rack system of claim 2, wherein the one or more first auxiliary devices includes a saddle bag having two storage compartments hanging downward on respective sides of a center portion, a small cargo deck, or a large cargo deck.

4. The bicycle rack system of claim 2, wherein the one or more second auxiliary devices includes a single foot guard and a double foot guard.

5. The bicycle rack system of claim 3, wherein each platform section is configured to accommodate a respective one of the pair of passenger seats, the saddle bag, the small cargo deck, or the large cargo deck.

6. The bicycle rack system of claim 5, wherein in a case where the first platform section accommodates one of the pair of passenger seats, the first deck section of the lower deck accommodates a respective second auxiliary device.

7. The bicycle rack system of claim 5, wherein in a case where the first platform section accommodates the saddle bag, bottom surfaces of the storage compartments of the saddle bag are secured to the first deck section of the lower deck.

8. The bicycle rack system of claim 5, wherein the first and second platform sections of the top platform, the side support, and the lateral member extend parallel to the lower deck.

9. The bicycle rack system of claim 3, wherein at least one platform section is configured to accommodate one of the small cargo deck or the saddle bag installed on the small cargo deck.

10. The bicycle rack system of claim 1, further comprising a handle that is attached at a front end of the top platform of the main frame.

11. The bicycle rack system of claim 1, wherein a front end of the top platform engages with a seat post supporting the primary seat of the bicycle, and a bottom end of the main frame engages with a hub on the rear wheel of the bicycle.

12. The bicycle rack system of claim 1, wherein the top platform and the lower deck of the main frame are each configured to accommodate each of the first and second auxiliary devices via a uniform set of connectors.

13. A method of providing a bicycle rack, comprising:
mounting a main frame having a top platform and a lower deck over a rear wheel of a bicycle;
mounting one or more first auxiliary devices to the top platform, wherein the top platform has a first platform section, a second platform section, and a side support defining a side edge of the first and second platform sections, at least one of the platform sections is configured to accommodate a respective first auxiliary device, and the side support extends rearwardly beyond a rear-most outer periphery of the rear wheel of the bicycle, and parallel to a ground surface when a front wheel of the bicycle and the rear wheel of the bicycle contact the ground surface, and wherein the side support is configured to detachably mount a pair of passenger seats rearward of the primary seat of the bicycle;
mounting one or more second auxiliary devices to the lower deck, wherein the lower deck has a first deck section and a second deck section, and at least one of the first and second deck sections is configured to accommodate a respective second auxiliary device;
mounting a plurality of support members connecting the side support of the top platform and the lower deck, and a lateral member connecting the plurality of support members, wherein the plurality of support members, the lateral member, and a portion of the side support together define a trapezoidal portion of the main frame disposed rearward of an axle of the rear wheel and configured to support at least one of the pair of passenger seats.

14. The method of claim 13, wherein the one or more first auxiliary devices includes at least one of the pair of passenger seats, a saddle bag having two storage compartments hanging downward on respective sides of a center portion, a small cargo deck, or a large cargo deck.

15. The method of claim 13, wherein the one or more second auxiliary devices includes a single foot guard and a double foot guard.

16. A bicycle, comprising:
a front wheel;
a rear wheel;
a primary seat; and
a bicycle rack comprising a main frame mounted over the rear wheel,
wherein the main frame comprises:
a top platform for accommodating one or more first auxiliary devices, the top platform having a first platform section and a second platform section, at least one of the platform sections configured to accommodate a respective first auxiliary device, wherein the top platform has a side support defining a side edge of the first and second platform sections, extending rearwardly beyond a rear-most outer periphery of the rear wheel of the bicycle, and parallel to a ground surface when the front and rear wheels of the bicycle contact the ground surface, and wherein the side support is configured to detachably mount a pair of passenger seats rearward of the primary seat of the bicycle;
a lower deck for accommodating one or more second auxiliary devices, the lower deck having a first deck section and a second deck section, wherein at least one of the first and second deck sections is configured to accommodate a respective second auxiliary device;
a plurality of support members connecting the side support of the top platform and the lower deck; and
a lateral member connecting the plurality of support members,
wherein the plurality of support members, the lateral member, and a portion of the side support together define a trapezoidal portion of the main frame disposed rearward of an axle of the rear wheel and configured to support at least one of the pair of passenger seats.

17. The bicycle of claim 16, wherein the one or more first auxiliary devices includes at least one of the pair of passenger seats, a saddle bag having two storage compartments hanging downward on respective sides of a center portion, a small cargo deck, or a large cargo deck.

18. The bicycle of claim 16, wherein the one or more second auxiliary devices includes a single foot guard and a double foot guard.

19. The bicycle of claim 16, wherein the top platform of the main frame is configured to accommodate one of the pair of passenger seats in one of the first and second platform sections and a saddle bag in the other of the first and second platform sections.

* * * * *